US012175849B2

(12) United States Patent
Claeys et al.

(10) Patent No.: US 12,175,849 B2
(45) **Date of Patent: *Dec. 24, 2024**

(54) ELONGATE FLEXIBLE TAG

(71) Applicant: TYCO Fire & Security GMBH, Neuhausen am Rheinfall (CH)

(72) Inventors: Patrick Claeys, Pembroke Pines, FL (US); Melwyn Sequeira, Plantation, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/671,076

(22) Filed: Feb. 14, 2022

(65) Prior Publication Data

US 2022/0172587 A1 Jun. 2, 2022

Related U.S. Application Data

(63) Continuation of application No. 17/057,503, filed as application No. PCT/IB2018/053626 on May 22, 2018, now Pat. No. 11,282,357.

(51) Int. Cl.
*G08B 13/24* (2006.01)

(52) U.S. Cl.
CPC ...... *G08B 13/2434* (2013.01); *G08B 13/2411* (2013.01); *G08B 13/2442* (2013.01)

(58) Field of Classification Search
CPC ............ E05B 73/0017; G08B 13/2434; G08B 13/2448; Y10T 70/5004; G06Q 20/203; G07G 3/003
See application file for complete search history.

(56) References Cited

U.S. PATENT DOCUMENTS

| | | | |
|---|---|---|---|
| 5,942,978 A * | 8/1999 | Shafer ................ | E05B 73/0017 70/57.1 |
| 5,963,144 A | 10/1999 | Kruest | |
| 6,147,655 A | 11/2000 | Roesner | |
| 6,152,348 A | 11/2000 | Finn et al. | |
| 6,229,443 B1 | 5/2001 | Roesner | |
| 6,265,976 B1 | 7/2001 | Roesner | |
| 6,646,336 B1 | 11/2003 | Marmaropoulos et al. | |
| 6,690,264 B2 | 2/2004 | Dalglish | |
| 6,967,579 B1 | 11/2005 | Elizondo | |
| 6,982,190 B2 | 1/2006 | Roesner | |
| 7,026,935 B2 | 4/2006 | Diorio et al. | |
| 7,026,936 B2 | 4/2006 | Roesner | |
| 7,030,786 B2 | 4/2006 | Kaplan et al. | |

(Continued)

FOREIGN PATENT DOCUMENTS

| | | |
|---|---|---|
| CN | 101523605 A | 9/2009 |
| CN | 101711430 A | 5/2010 |

(Continued)

*Primary Examiner* — Mirza F Alam
(74) *Attorney, Agent, or Firm* — ArentFox Schiff, LLP

(57) ABSTRACT

Systems and methods for providing a tag. The tag comprising a flexible elongate structure comprising a cord or a cable; an electronic thread device integrated into the cord or cable that is operative to wirelessly communicate with external devices for inventory management or security purposes; and/or an Electronic Article Surveillance ("EAS") component integrated into the cord or cable.

19 Claims, 15 Drawing Sheets

(56) References Cited

U.S. PATENT DOCUMENTS

| | | | |
|---|---|---|---|
| 7,038,544 | B2 | 5/2006 | Diorio et al. |
| 7,038,573 | B2 | 5/2006 | Bann |
| 7,038,603 | B2 | 5/2006 | Diorio et al. |
| 7,049,964 | B2 | 5/2006 | Hyde et al. |
| 7,054,595 | B2 | 5/2006 | Bann |
| 7,061,324 | B2 | 6/2006 | Diorio et al. |
| 7,064,653 | B2 | 6/2006 | Dalglish |
| 7,107,022 | B1 | 9/2006 | Thomas et al. |
| 7,116,240 | B2 | 10/2006 | Hyde |
| 7,119,664 | B2 | 10/2006 | Roesner |
| 7,120,550 | B2 | 10/2006 | Diorio et al. |
| 7,123,171 | B2 | 10/2006 | Kaplan et al. |
| 7,154,283 | B1 | 12/2006 | Weakley et al. |
| 7,158,408 | B2 | 1/2007 | Roesner et al. |
| 7,183,926 | B2 | 2/2007 | Diorio et al. |
| 7,187,237 | B1 | 3/2007 | Diorio et al. |
| 7,187,290 | B2 | 3/2007 | Hyde et al. |
| 7,199,456 | B2 | 4/2007 | Krappe et al. |
| 7,199,663 | B2 | 4/2007 | Diorio et al. |
| 7,212,446 | B2 | 5/2007 | Diorio et al. |
| 7,215,251 | B2 | 5/2007 | Hyde |
| D543,976 | S | 6/2007 | Oliver |
| D546,819 | S | 7/2007 | Oliver |
| D546,820 | S | 7/2007 | Oliver |
| D546,821 | S | 7/2007 | Oliver |
| D546,822 | S | 7/2007 | Oliver |
| D547,306 | S | 7/2007 | Oliver |
| D547,754 | S | 7/2007 | Oliver |
| 7,245,213 | B1 | 7/2007 | Esterberg et al. |
| 7,246,751 | B2 | 7/2007 | Diorio et al. |
| D548,225 | S | 8/2007 | Oliver |
| 7,253,719 | B2 | 8/2007 | Diorio et al. |
| 7,253,735 | B2 | 8/2007 | Gengel et al. |
| 7,283,037 | B2 | 10/2007 | Diorio et al. |
| 7,304,579 | B2 | 12/2007 | Diorio et al. |
| 7,307,528 | B2 | 12/2007 | Glidden et al. |
| 7,307,529 | B2 | 12/2007 | Gutnik et al. |
| 7,307,534 | B2 | 12/2007 | Pesavento |
| 7,312,622 | B2 | 12/2007 | Hyde et al. |
| D562,810 | S | 2/2008 | Oliver |
| D563,397 | S | 3/2008 | Oliver |
| 7,375,626 | B2 | 5/2008 | Ening |
| 7,380,190 | B2 | 5/2008 | Hara et al. |
| D570,337 | S | 6/2008 | Oliver |
| 7,382,257 | B2 | 6/2008 | Thomas et al. |
| 7,388,468 | B2 | 6/2008 | Diorio et al. |
| 7,389,101 | B2 | 6/2008 | Diorio et al. |
| 7,391,329 | B2 | 6/2008 | Humes et al. |
| 7,394,324 | B2 | 7/2008 | Diorio et al. |
| 7,400,255 | B2 | 7/2008 | Horch |
| 7,405,659 | B1 | 7/2008 | Hyde |
| 7,405,660 | B2 | 7/2008 | Diorio et al. |
| D574,369 | S | 8/2008 | Oliver |
| D574,370 | S | 8/2008 | Oliver |
| 7,408,466 | B2 | 8/2008 | Diorio et al. |
| 7,417,548 | B2 | 8/2008 | Kavounas et al. |
| 7,419,096 | B2 | 9/2008 | Esterberg et al. |
| 7,420,469 | B1 | 9/2008 | Oliver |
| 7,423,539 | B2 | 9/2008 | Hyde et al. |
| D578,114 | S | 10/2008 | Oliver |
| 7,432,814 | B2 | 10/2008 | Dietrich et al. |
| 7,436,308 | B2 | 10/2008 | Sundstrom et al. |
| 7,448,547 | B2 | 11/2008 | Esterberg |
| 7,469,126 | B2 | 12/2008 | Miettinen et al. |
| 7,472,835 | B2 | 1/2009 | Diorio et al. |
| D586,336 | S | 2/2009 | Oliver |
| 7,489,248 | B2 | 2/2009 | Gengel et al. |
| 7,492,164 | B2 | 2/2009 | Hanhikorpi et al. |
| D587,691 | S | 3/2009 | Oliver |
| 7,501,953 | B2 | 3/2009 | Diorio et al. |
| 7,510,117 | B2 | 3/2009 | Esterberg |
| 7,518,516 | B2 | 4/2009 | Azevedo et al. |
| 7,525,438 | B2 | 4/2009 | Hyde et al. |
| D592,192 | S | 5/2009 | Oliver |
| 7,528,724 | B2 | 5/2009 | Horch |
| 7,528,728 | B2 | 5/2009 | Oliver et al. |
| 7,541,843 | B1 | 6/2009 | Hyde et al. |
| 7,561,866 | B2 | 7/2009 | Oliver et al. |
| 7,589,618 | B2 | 9/2009 | Diorio et al. |
| 7,592,897 | B2 | 9/2009 | Diorio et al. |
| D605,641 | S | 12/2009 | Oliver |
| D606,056 | S | 12/2009 | Oliver |
| D606,057 | S | 12/2009 | Oliver |
| 7,633,376 | B2 | 12/2009 | Diorio et al. |
| 7,651,882 | B1 | 1/2010 | Bockorick et al. |
| D610,576 | S | 2/2010 | Oliver |
| 7,667,231 | B2 | 2/2010 | Hyde et al. |
| 7,667,589 | B2 | 2/2010 | Desmons et al. |
| D611,037 | S | 3/2010 | Oliver |
| 7,679,957 | B2 | 3/2010 | Ma et al. |
| D613,276 | S | 4/2010 | Oliver |
| 7,696,882 | B1 | 4/2010 | Rahimi et al. |
| 7,696,947 | B2 | 4/2010 | Gallschuetz et al. |
| 7,714,593 | B2 | 5/2010 | Varpula et al. |
| 7,715,236 | B2 | 5/2010 | Hyde |
| 7,719,406 | B2 | 5/2010 | Bajahr |
| D617,320 | S | 6/2010 | Oliver |
| 7,733,227 | B1 | 6/2010 | Pesavento et al. |
| D620,484 | S | 7/2010 | Oliver |
| D620,928 | S | 8/2010 | Oliver |
| 7,768,248 | B1 | 8/2010 | Hyde |
| 7,768,406 | B1 | 8/2010 | Peach et al. |
| 7,787,837 | B2 | 8/2010 | Mikuteit |
| 7,804,411 | B2 | 9/2010 | Copeland |
| 7,808,387 | B1 | 10/2010 | Kuhn |
| 7,808,823 | B2 | 10/2010 | Ma et al. |
| 7,812,729 | B2 | 10/2010 | Copeland |
| 7,830,262 | B1 | 11/2010 | Diorio et al. |
| 7,830,322 | B1 | 11/2010 | Oliver et al. |
| 7,843,399 | B2 | 11/2010 | Stobbe |
| 7,872,582 | B1 | 1/2011 | Diorio |
| 7,884,725 | B2 | 2/2011 | Kruest et al. |
| 7,907,899 | B1 | 3/2011 | Oliver |
| 7,917,088 | B2 | 3/2011 | Hyde et al. |
| 7,920,046 | B1 | 4/2011 | Aiouaz et al. |
| 7,969,364 | B2 | 6/2011 | Kriebel et al. |
| 7,973,643 | B2 | 7/2011 | Hyde et al. |
| 7,973,645 | B1 | 7/2011 | Moretti et al. |
| 7,973,661 | B2 | 7/2011 | Copeland |
| 7,975,414 | B2 | 7/2011 | Ritamäki et al. |
| 7,978,005 | B1 | 7/2011 | Hyde et al. |
| 7,982,611 | B1 | 7/2011 | Picasso et al. |
| 7,990,249 | B1 | 8/2011 | Hyde et al. |
| 7,994,897 | B2 | 8/2011 | Azevedo et al. |
| 7,999,675 | B2 | 8/2011 | Diorio et al. |
| 8,028,923 | B2 | 10/2011 | Shafran et al. |
| 8,044,774 | B1 | 10/2011 | Diorio |
| 8,044,801 | B1 | 10/2011 | Hyde et al. |
| 8,056,814 | B2 | 11/2011 | Martin et al. |
| 8,063,740 | B1 | 11/2011 | Diorio et al. |
| 8,072,327 | B2 | 12/2011 | Enyedy et al. |
| 8,072,329 | B1 | 12/2011 | Srinivas et al. |
| 8,072,332 | B2 | 12/2011 | Forster |
| 8,077,013 | B2 | 12/2011 | Cooper |
| 8,082,556 | B1 | 12/2011 | Aiouaz et al. |
| 8,093,617 | B2 | 1/2012 | Vicard et al. |
| 8,093,996 | B2 | 1/2012 | Heurtier |
| 8,098,134 | B2 | 1/2012 | Azevedo et al. |
| 8,115,590 | B1 | 2/2012 | Diorio et al. |
| 8,115,597 | B1 | 2/2012 | Oliver et al. |
| 8,115,632 | B1 | 2/2012 | Rahimi et al. |
| 8,120,494 | B1 | 2/2012 | Aiouaz et al. |
| 8,134,451 | B1 | 3/2012 | Diorio |
| 8,154,385 | B2 | 4/2012 | Aiouaz et al. |
| 8,174,367 | B1 | 5/2012 | Diorio |
| 8,179,265 | B2 | 5/2012 | Elizondo et al. |
| 8,188,867 | B2 | 5/2012 | Rietzler |
| 8,188,927 | B1 | 5/2012 | Koepp et al. |
| 8,193,912 | B1 | 6/2012 | Gutnik et al. |
| 8,201,748 | B2 | 6/2012 | Koepp et al. |
| 8,224,610 | B2 | 7/2012 | Diorio et al. |
| 8,228,175 | B1 | 7/2012 | Diorio et al. |
| 8,237,562 | B1 | 8/2012 | Picasso et al. |
| 8,244,201 | B2 | 8/2012 | Oliver et al. |

(56) References Cited

U.S. PATENT DOCUMENTS

| | | | |
|---|---|---|---|
| 8,258,918 | B1 | 9/2012 | Diorio et al. |
| 8,258,955 | B1 | 9/2012 | Hyde et al. |
| 8,260,241 | B1 | 9/2012 | Hyde |
| 8,279,045 | B2 | 10/2012 | Diorio et al. |
| 8,294,582 | B1 | 10/2012 | Humes et al. |
| 8,303,389 | B2 | 11/2012 | Wilm |
| 8,305,764 | B2 | 11/2012 | Rietzler |
| 8,325,014 | B1 | 12/2012 | Sundstrom et al. |
| 8,325,042 | B1 | 12/2012 | Hyde et al. |
| 8,326,256 | B1 | 12/2012 | Kuhn |
| 8,334,751 | B2 | 12/2012 | Azevedo et al. |
| 8,342,402 | B2 | 1/2013 | Kriebel et al. |
| 8,344,857 | B1 | 1/2013 | Oliver et al. |
| 8,350,665 | B1 | 1/2013 | Sundstrom et al. |
| 8,350,702 | B2 | 1/2013 | Copeland et al. |
| 8,354,917 | B2 | 1/2013 | Diorio et al. |
| 8,390,425 | B1 | 3/2013 | Cooper et al. |
| 8,390,430 | B1 | 3/2013 | Sundstrom et al. |
| 8,390,431 | B1 | 3/2013 | Diorio |
| 8,391,785 | B2 | 3/2013 | Hyde et al. |
| 8,427,315 | B2 | 4/2013 | Aiouaz et al. |
| 8,428,515 | B1 | 4/2013 | Oliver |
| 8,446,258 | B2 | 5/2013 | Diorio et al. |
| 8,448,874 | B2 | 5/2013 | Koskelainen |
| 8,451,095 | B2 | 5/2013 | Azevedo et al. |
| 8,451,119 | B1 | 5/2013 | Rahimi et al. |
| 8,451,673 | B1 | 5/2013 | Pesavento et al. |
| 8,471,708 | B1 | 6/2013 | Diorio et al. |
| 8,471,773 | B2 | 6/2013 | Vicard et al. |
| 8,511,569 | B1 | 8/2013 | Koepp et al. |
| 8,536,075 | B2 | 9/2013 | Leonard |
| 8,570,157 | B1 | 10/2013 | Diorio et al. |
| 8,587,411 | B1 | 11/2013 | Diorio |
| 8,593,257 | B1 | 11/2013 | Diorio et al. |
| D695,278 | S | 12/2013 | Koskelainen |
| 8,600,298 | B1 | 12/2013 | Hyde et al. |
| 8,610,580 | B2 | 12/2013 | Elizondo et al. |
| 8,614,506 | B1 | 12/2013 | Fassett et al. |
| 8,616,459 | B2 | 12/2013 | Sykko et al. |
| 8,661,652 | B1 | 3/2014 | Koepp et al. |
| 8,665,074 | B1 | 3/2014 | Diorio et al. |
| 8,669,872 | B1 | 3/2014 | Stanford et al. |
| 8,669,874 | B2 | 3/2014 | Kruest et al. |
| 8,680,973 | B2 | 3/2014 | Kruest et al. |
| 8,698,629 | B1 | 4/2014 | Stanford et al. |
| 8,717,145 | B2 | 5/2014 | Ho et al. |
| D710,337 | S | 8/2014 | Koskelainen |
| 8,796,865 | B1 | 8/2014 | Fassett et al. |
| 8,810,376 | B1 | 8/2014 | Picasso et al. |
| 8,814,054 | B2 | 8/2014 | Brun et al. |
| 8,816,909 | B2 | 8/2014 | Jiang et al. |
| 8,830,038 | B1 | 9/2014 | Stanford et al. |
| 8,830,064 | B1 | 9/2014 | Stanford et al. |
| 8,830,065 | B1 | 9/2014 | Stanford et al. |
| 8,866,594 | B1 | 10/2014 | Diorio et al. |
| 8,866,595 | B1 | 10/2014 | Diorio et al. |
| 8,866,596 | B1 | 10/2014 | Diorio et al. |
| 8,872,636 | B1 | 10/2014 | Diorio et al. |
| 8,881,373 | B1 | 11/2014 | Koepp et al. |
| 8,902,627 | B1 | 12/2014 | Pesavento et al. |
| 8,907,795 | B2 | 12/2014 | Soto et al. |
| 8,917,179 | B2 | 12/2014 | Alicot et al. |
| 8,917,219 | B2 | 12/2014 | Semar et al. |
| 8,952,792 | B1 | 2/2015 | Srinivas et al. |
| 8,967,486 | B2 | 3/2015 | Chandramowle et al. |
| 8,988,199 | B1 | 3/2015 | Moretti et al. |
| 8,991,714 | B2 | 3/2015 | Elizondo et al. |
| 8,998,097 | B2 | 4/2015 | Launiainen |
| 9,000,835 | B1 | 4/2015 | Peach et al. |
| D729,780 | S | 5/2015 | Koskelainen et al. |
| 9,024,729 | B1 | 5/2015 | Diorio et al. |
| 9,024,731 | B1 | 5/2015 | Diorio et al. |
| 9,031,504 | B1 | 5/2015 | Hyde et al. |
| 9,035,748 | B2 | 5/2015 | Greefkes |
| 9,053,400 | B2 | 6/2015 | Diorio et al. |
| 9,058,554 | B2 | 6/2015 | Kervinen et al. |
| 9,064,196 | B1 | 6/2015 | Gutnik et al. |
| 9,064,199 | B2 | 6/2015 | Nitta |
| 9,070,066 | B1 | 6/2015 | Oliver et al. |
| 9,076,049 | B1 | 7/2015 | Moretti et al. |
| 9,087,281 | B2 | 7/2015 | Maguire et al. |
| 9,087,282 | B1 | 7/2015 | Hyde et al. |
| 9,104,923 | B1 | 8/2015 | Stanford et al. |
| 9,111,283 | B1 | 8/2015 | Diorio et al. |
| 9,129,168 | B1 | 9/2015 | Diorio et al. |
| 9,129,169 | B1 | 9/2015 | Diorio et al. |
| 9,135,476 | B2 | 9/2015 | Virtanen |
| 9,142,881 | B1 | 9/2015 | Oliver et al. |
| 9,165,170 | B1 | 10/2015 | Gutnik et al. |
| 9,178,277 | B1 | 11/2015 | Moretti et al. |
| 9,183,717 | B1 | 11/2015 | Diorio et al. |
| 9,189,904 | B1 | 11/2015 | Diorio et al. |
| 9,197,294 | B2 | 11/2015 | Alicot et al. |
| 9,202,093 | B2 | 12/2015 | Nummila et al. |
| 9,213,870 | B1 | 12/2015 | Diorio et al. |
| 9,213,871 | B1 | 12/2015 | Diorio et al. |
| 9,215,809 | B2 | 12/2015 | Nieland et al. |
| 9,239,941 | B1 | 1/2016 | Diorio |
| 9,247,634 | B2 | 1/2016 | Kruest et al. |
| 9,253,876 | B2 | 2/2016 | Elizondo et al. |
| 9,281,552 | B2 | 3/2016 | Virtanen |
| 9,299,586 | B1 * | 3/2016 | West ....................... H01L 21/32 |
| 9,305,195 | B1 | 4/2016 | Diorio et al. |
| 9,317,799 | B1 | 4/2016 | Koepp et al. |
| 9,325,053 | B2 | 4/2016 | Virtanen et al. |
| 9,330,284 | B1 | 5/2016 | Diorio |
| 9,342,775 | B2 | 5/2016 | Forster |
| 9,349,032 | B1 | 5/2016 | Diorio et al. |
| 9,349,090 | B1 | 5/2016 | Srinivas et al. |
| 9,373,012 | B2 | 6/2016 | Pesavento et al. |
| 9,390,603 | B2 | 7/2016 | Li et al. |
| 9,405,945 | B1 | 8/2016 | Diorio et al. |
| 9,430,683 | B1 | 8/2016 | Hyde |
| 9,454,680 | B1 | 9/2016 | Diorio |
| 9,460,380 | B1 | 10/2016 | Koepp et al. |
| 9,471,816 | B1 | 10/2016 | Hyde et al. |
| 9,489,611 | B1 | 11/2016 | Diorio et al. |
| 9,495,631 | B1 | 11/2016 | Koepp et al. |
| 9,501,675 | B1 | 11/2016 | Diorio et al. |
| 9,501,736 | B2 | 11/2016 | Elizondo et al. |
| 9,503,160 | B1 | 11/2016 | Hyde |
| 9,542,636 | B2 | 1/2017 | Buehler |
| 9,565,022 | B1 | 2/2017 | Robshaw et al. |
| 9,582,690 | B2 | 2/2017 | Rietzler |
| 9,589,224 | B2 | 3/2017 | Patterson et al. |
| 9,607,191 | B1 | 3/2017 | Peach et al. |
| 9,607,286 | B1 | 3/2017 | Diorio |
| 9,626,619 | B2 | 4/2017 | Kruest et al. |
| 9,633,302 | B1 | 4/2017 | Heinrich |
| 9,646,186 | B1 | 5/2017 | Hyde et al. |
| 9,652,643 | B1 | 5/2017 | Pesavento et al. |
| 9,690,949 | B1 | 6/2017 | Diorio et al. |
| 9,691,243 | B1 | 6/2017 | Diorio et al. |
| 9,697,387 | B1 | 7/2017 | Bowman et al. |
| 9,715,605 | B1 | 7/2017 | Sundstrom et al. |
| 9,740,891 | B1 | 8/2017 | Robshaw et al. |
| 9,747,542 | B2 | 8/2017 | Elizondo et al. |
| 9,767,333 | B1 | 9/2017 | Diorio et al. |
| 9,773,133 | B2 | 9/2017 | Oliver et al. |
| 9,773,201 | B2 | 9/2017 | Shafran et al. |
| 9,779,599 | B2 | 10/2017 | Sharpy et al. |
| 9,792,472 | B1 | 10/2017 | Robshaw et al. |
| 9,792,543 | B2 | 10/2017 | Kuschewski et al. |
| 9,805,223 | B1 | 10/2017 | Bowman et al. |
| 9,805,235 | B2 | 10/2017 | Kruest et al. |
| 9,818,084 | B1 | 11/2017 | Diorio et al. |
| 9,831,724 | B2 | 11/2017 | Copeland et al. |
| 9,846,794 | B2 | 12/2017 | Greefkes |
| 9,846,833 | B1 | 12/2017 | Koepp et al. |
| 9,852,319 | B1 | 12/2017 | Pesavento et al. |
| 9,875,438 | B1 | 1/2018 | Diorio et al. |
| 9,881,186 | B1 | 1/2018 | Sundstrom et al. |
| 9,881,473 | B1 | 1/2018 | Diorio et al. |
| 9,886,658 | B1 | 2/2018 | Stanford et al. |

(56) References Cited

U.S. PATENT DOCUMENTS

| | | | |
|---|---|---|---|
| 9,887,843 B1 | 2/2018 | Robshaw et al. | |
| 9,911,017 B2 | 3/2018 | Uhl et al. | |
| 9,911,018 B1 | 3/2018 | Heinrich et al. | |
| 9,916,483 B1 | 3/2018 | Robshaw et al. | |
| 9,916,484 B2 | 3/2018 | Pesavento et al. | |
| 9,922,215 B2 | 3/2018 | Huhtasalo et al. | |
| 9,928,388 B1 | 3/2018 | Bowman et al. | |
| 9,928,390 B1 | 3/2018 | Diorio et al. | |
| 9,940,490 B1 | 4/2018 | Robshaw et al. | |
| 9,953,198 B2 | 4/2018 | Kohler et al. | |
| 9,954,278 B1 | 4/2018 | Moretti et al. | |
| 9,959,435 B1 | 5/2018 | Diorio et al. | |
| 9,959,494 B1 | 5/2018 | Shyamkumar et al. | |
| 9,977,932 B2 | 5/2018 | Rietzler | |
| 10,002,266 B1 | 6/2018 | Hyde et al. | |
| 10,013,587 B1 | 7/2018 | Pesavento et al. | |
| 10,037,444 B1 | 7/2018 | Sundstrom et al. | |
| 10,043,046 B1 | 8/2018 | Robshaw et al. | |
| 10,049,317 B1 | 8/2018 | Diorio et al. | |
| 10,061,950 B1 | 8/2018 | Pesavento et al. | |
| 10,068,167 B2 | 9/2018 | Huhtasalo | |
| 10,084,597 B1 | 9/2018 | Robshaw et al. | |
| 10,089,478 B1 * | 10/2018 | Fraser | B42D 25/29 |
| 10,116,033 B1 | 10/2018 | Koepp et al. | |
| 10,121,033 B1 | 11/2018 | Robshaw et al. | |
| 10,133,894 B2 | 11/2018 | Kruest et al. | |
| 10,146,969 B1 | 12/2018 | Diorio et al. | |
| 10,169,625 B1 | 1/2019 | Diorio et al. | |
| 10,186,127 B1 | 1/2019 | Diorio et al. | |
| 10,204,245 B1 | 2/2019 | Diorio et al. | |
| 10,204,246 B1 | 2/2019 | Maguire et al. | |
| 10,235,545 B2 | 3/2019 | Kruest et al. | |
| 10,262,167 B2 | 4/2019 | Nyalamadugu et al. | |
| 10,311,351 B1 | 6/2019 | Diorio et al. | |
| 10,311,353 B1 | 6/2019 | Diorio et al. | |
| 10,325,125 B1 | 6/2019 | Pesavento et al. | |
| 10,331,993 B1 | 6/2019 | Koepp et al. | |
| 10,339,436 B2 | 7/2019 | Huhtasalo | |
| 10,373,038 B1 | 8/2019 | Stanford | |
| 10,373,115 B1 | 8/2019 | Diorio et al. | |
| 10,402,710 B1 | 9/2019 | Diorio et al. | |
| 10,417,085 B1 | 9/2019 | Diorio | |
| 10,417,464 B2 | 9/2019 | Huhtasalo et al. | |
| 10,430,623 B1 | 10/2019 | Pesavento et al. | |
| 10,445,535 B1 | 10/2019 | Hyde et al. | |
| D865,726 S | 11/2019 | Oliver | |
| 10,474,851 B2 | 11/2019 | Greefkes | |
| RE47,755 E | 12/2019 | Hyde et al. | |
| 10,521,768 B1 | 12/2019 | Diorio et al. | |
| 10,546,162 B1 | 1/2020 | Diorio | |
| 10,558,828 B2 | 2/2020 | Martinez De Velasco Cortina et al. | |
| 10,572,703 B1 | 2/2020 | Shyamkumar et al. | |
| 10,572,789 B1 | 2/2020 | Stanford et al. | |
| D879,077 S | 3/2020 | Oliver | |
| 10,600,298 B1 | 3/2020 | Diorio et al. | |
| 10,650,201 B1 | 5/2020 | Maguire et al. | |
| 10,650,202 B1 | 5/2020 | Robshaw et al. | |
| 10,650,346 B1 | 5/2020 | Pesavento et al. | |
| 10,664,670 B1 | 5/2020 | Diorio et al. | |
| D887,400 S | 6/2020 | Oliver | |
| 10,679,019 B1 | 6/2020 | Thomas et al. | |
| 10,679,115 B2 | 6/2020 | Huhtasalo | |
| 10,699,178 B1 | 6/2020 | Diorio et al. | |
| 10,713,453 B1 | 7/2020 | Diorio et al. | |
| 10,713,549 B1 | 7/2020 | Peach et al. | |
| 10,719,671 B1 | 7/2020 | Robshaw et al. | |
| 10,720,700 B1 | 7/2020 | Moretti et al. | |
| 10,733,395 B1 | 8/2020 | Diorio et al. | |
| 10,740,574 B1 | 8/2020 | Stanford et al. | |
| 10,776,198 B1 | 9/2020 | Diorio | |
| 10,783,424 B1 | 9/2020 | Trivelpiece et al. | |
| 10,790,160 B2 | 9/2020 | Singleton et al. | |
| 10,819,319 B1 | 10/2020 | Hyde | |
| 10,824,824 B1 | 11/2020 | Diorio | |
| 10,846,583 B1 | 11/2020 | Koepp et al. | |
| 10,860,819 B1 | 12/2020 | Pesavento et al. | |
| 10,878,371 B1 | 12/2020 | Stanford et al. | |
| 10,878,685 B1 | 12/2020 | Diorio et al. | |
| 10,885,417 B1 | 1/2021 | Stanford et al. | |
| 10,885,421 B1 | 1/2021 | Diorio et al. | |
| 10,902,308 B2 | 1/2021 | Gire et al. | |
| 10,916,114 B1 | 2/2021 | Diorio et al. | |
| 10,929,734 B1 | 2/2021 | Hyde et al. | |
| 10,936,929 B1 | 3/2021 | Diorio et al. | |
| 10,956,693 B1 | 3/2021 | Shyamkumar et al. | |
| 10,995,523 B2 | 5/2021 | Claeys et al. | |
| 11,017,187 B1 | 5/2021 | Thomas et al. | |
| 11,017,349 B1 | 5/2021 | Diorio et al. | |
| 11,024,936 B1 | 6/2021 | Koepp et al. | |
| 11,062,190 B1 | 7/2021 | Diorio et al. | |
| 11,107,034 B1 | 8/2021 | Pesavento et al. | |
| D929,975 S | 9/2021 | Abdul Rahman | |
| 11,120,320 B1 | 9/2021 | Robshaw et al. | |
| 11,132,589 B2 | 9/2021 | Chandramowle et al. | |
| 11,188,803 B1 | 11/2021 | Patil et al. | |
| 11,200,387 B1 | 12/2021 | Stanford et al. | |
| 11,232,340 B1 | 1/2022 | Diorio et al. | |
| 11,244,282 B1 | 2/2022 | Diorio et al. | |
| 11,259,443 B1 | 2/2022 | T. Kunasekaran et al. | |
| 11,282,357 B2 * | 3/2022 | Claeys | G08B 13/2434 |
| 11,288,564 B1 | 3/2022 | Koepp et al. | |
| 11,300,467 B2 | 4/2022 | Boellaard et al. | |
| 11,321,547 B1 | 5/2022 | Pesavento et al. | |
| 11,341,343 B1 | 5/2022 | Diorio | |
| 11,341,837 B1 | 5/2022 | Diorio et al. | |
| 11,361,174 B1 | 6/2022 | Robshaw et al. | |
| 11,403,505 B1 | 8/2022 | Diorio et al. | |
| 11,423,278 B1 | 8/2022 | Koepp et al. | |
| 11,443,160 B2 | 9/2022 | Trivelpiece et al. | |
| 11,461,570 B1 | 10/2022 | Shyamkumar et al. | |
| 11,481,591 B1 | 10/2022 | Peach et al. | |
| 11,481,592 B1 | 10/2022 | Diorio et al. | |
| 11,514,254 B1 | 11/2022 | Diorio | |
| 11,514,255 B1 | 11/2022 | Thomas et al. | |
| 11,519,200 B2 | 12/2022 | Claeys et al. | |
| 2001/0034063 A1 | 10/2001 | Saunders et al. | |
| 2002/0088154 A1 | 7/2002 | Sandt et al. | |
| 2002/0097143 A1 | 7/2002 | Dalglish | |
| 2003/0136503 A1 | 7/2003 | Green et al. | |
| 2003/0160732 A1 * | 8/2003 | Van Heerden | G06K 19/07749 343/897 |
| 2004/0026754 A1 | 2/2004 | Liu et al. | |
| 2004/0125040 A1 | 7/2004 | Ferguson et al. | |
| 2004/0192011 A1 | 9/2004 | Roesner | |
| 2004/0195593 A1 | 10/2004 | Diorio et al. | |
| 2004/0200061 A1 | 10/2004 | Coleman et al. | |
| 2005/0001785 A1 | 1/2005 | Ferguson et al. | |
| 2005/0052281 A1 | 3/2005 | Bann | |
| 2005/0054293 A1 | 3/2005 | Bann | |
| 2005/0057341 A1 | 3/2005 | Roesner | |
| 2005/0058292 A1 | 3/2005 | Diorio et al. | |
| 2005/0068179 A1 | 3/2005 | Roesner | |
| 2005/0068180 A1 | 3/2005 | Miettinen et al. | |
| 2005/0093690 A1 | 5/2005 | Miglionico | |
| 2005/0099269 A1 | 5/2005 | Diorio et al. | |
| 2005/0099270 A1 | 5/2005 | Diorio et al. | |
| 2005/0140448 A1 | 6/2005 | Diorio et al. | |
| 2005/0140449 A1 | 6/2005 | Diorio et al. | |
| 2005/0162233 A1 | 7/2005 | Diorio et al. | |
| 2005/0185460 A1 | 8/2005 | Roesner et al. | |
| 2005/0200402 A1 | 9/2005 | Diorio et al. | |
| 2005/0200415 A1 | 9/2005 | Diorio et al. | |
| 2005/0200416 A1 | 9/2005 | Diorio et al. | |
| 2005/0200417 A1 | 9/2005 | Diorio et al. | |
| 2005/0212674 A1 | 9/2005 | Desmons et al. | |
| 2005/0223286 A1 | 10/2005 | Forster | |
| 2005/0225433 A1 | 10/2005 | Diorio et al. | |
| 2005/0225434 A1 | 10/2005 | Diorio et al. | |
| 2005/0225435 A1 | 10/2005 | Diorio et al. | |
| 2005/0225436 A1 | 10/2005 | Diorio et al. | |
| 2005/0225447 A1 | 10/2005 | Diorio et al. | |
| 2005/0237157 A1 | 10/2005 | Cooper et al. | |
| 2005/0237158 A1 | 10/2005 | Cooper et al. | |

(56) References Cited

U.S. PATENT DOCUMENTS

| | | | |
|---|---|---|---|
| 2005/0237159 | A1 | 10/2005 | Cooper et al. |
| 2005/0237162 | A1 | 10/2005 | Hyde et al. |
| 2005/0237843 | A1 | 10/2005 | Hyde |
| 2005/0237844 | A1 | 10/2005 | Hyde |
| 2005/0240369 | A1 | 10/2005 | Diorio et al. |
| 2005/0240370 | A1 | 10/2005 | Diorio et al. |
| 2005/0240739 | A1 | 10/2005 | Pesavento |
| 2005/0269408 | A1 | 12/2005 | Esterberg et al. |
| 2005/0270141 | A1 | 12/2005 | Dalglish |
| 2005/0270185 | A1 | 12/2005 | Esterberg |
| 2005/0270189 | A1 | 12/2005 | Kaplan et al. |
| 2005/0275533 | A1 | 12/2005 | Hanhikorpi et al. |
| 2005/0280505 | A1 | 12/2005 | Humes et al. |
| 2005/0280506 | A1 | 12/2005 | Lobanov et al. |
| 2005/0280507 | A1 | 12/2005 | Diorio et al. |
| 2005/0282495 | A1 | 12/2005 | Forster |
| 2006/0033622 | A1 | 2/2006 | Hyde et al. |
| 2006/0043198 | A1 | 3/2006 | Forster |
| 2006/0044769 | A1 | 3/2006 | Forster et al. |
| 2006/0049917 | A1 | 3/2006 | Hyde et al. |
| 2006/0049928 | A1 | 3/2006 | Ening |
| 2006/0055620 | A1 | 3/2006 | Oliver et al. |
| 2006/0063323 | A1 | 3/2006 | Munn |
| 2006/0071758 | A1 | 4/2006 | Cooper et al. |
| 2006/0071759 | A1 | 4/2006 | Cooper et al. |
| 2006/0071793 | A1 | 4/2006 | Pesavento |
| 2006/0071796 | A1 | 4/2006 | Korzeniewski |
| 2006/0082442 | A1 | 4/2006 | Sundstrom |
| 2006/0086810 | A1 | 4/2006 | Diorio et al. |
| 2006/0098765 | A1 | 5/2006 | Thomas et al. |
| 2006/0125505 | A1 | 6/2006 | Glidden et al. |
| 2006/0125506 | A1 | 6/2006 | Hara et al. |
| 2006/0125507 | A1 | 6/2006 | Hyde et al. |
| 2006/0125508 | A1 | 6/2006 | Glidden et al. |
| 2006/0125641 | A1 | 6/2006 | Forster |
| 2006/0133140 | A1 | 6/2006 | Gutnik et al. |
| 2006/0133175 | A1 | 6/2006 | Gutnik et al. |
| 2006/0145710 | A1 | 7/2006 | Puleston et al. |
| 2006/0145855 | A1 | 7/2006 | Diorio et al. |
| 2006/0145861 | A1 | 7/2006 | Forster et al. |
| 2006/0145864 | A1 | 7/2006 | Jacober et al. |
| 2006/0163370 | A1 | 7/2006 | Diorio et al. |
| 2006/0164214 | A1 | 7/2006 | Bajahr |
| 2006/0186960 | A1 | 8/2006 | Diorio et al. |
| 2006/0187031 | A1 | 8/2006 | Moretti et al. |
| 2006/0187094 | A1 | 8/2006 | Kaplan et al. |
| 2006/0197668 | A1 | 9/2006 | Oliver et al. |
| 2006/0199551 | A1 | 9/2006 | Thomas et al. |
| 2006/0202705 | A1 | 9/2006 | Forster |
| 2006/0202831 | A1 | 9/2006 | Horch |
| 2006/0206277 | A1 | 9/2006 | Horch |
| 2006/0211386 | A1 | 9/2006 | Thomas et al. |
| 2006/0220639 | A1 | 10/2006 | Hyde |
| 2006/0220865 | A1 | 10/2006 | Babine et al. |
| 2006/0221715 | A1 | 10/2006 | Ma et al. |
| 2006/0224647 | A1 | 10/2006 | Gutnik |
| 2006/0226982 | A1 | 10/2006 | Forster |
| 2006/0226983 | A1 | 10/2006 | Forster et al. |
| 2006/0236203 | A1 | 10/2006 | Diorio et al. |
| 2006/0238345 | A1 | 10/2006 | Ferguson et al. |
| 2006/0244598 | A1 | 11/2006 | Hyde et al. |
| 2006/0250245 | A1 | 11/2006 | Forster |
| 2006/0250246 | A1 | 11/2006 | Forster |
| 2006/0252182 | A1 | 11/2006 | Wang et al. |
| 2006/0261952 | A1 | 11/2006 | Kavounas et al. |
| 2006/0261953 | A1 | 11/2006 | Diorio et al. |
| 2006/0261954 | A1 | 11/2006 | Dietrich et al. |
| 2006/0261955 | A1 | 11/2006 | Humes et al. |
| 2006/0261956 | A1 | 11/2006 | Sundstrom et al. |
| 2006/0271328 | A1 | 11/2006 | Forster |
| 2006/0273170 | A1 | 12/2006 | Forster et al. |
| 2007/0001856 | A1 | 1/2007 | Diorio et al. |
| 2007/0008238 | A1 | 1/2007 | Liu et al. |
| 2007/0024446 | A1 | 2/2007 | Hyde et al. |
| 2007/0035466 | A1 | 2/2007 | Coleman et al. |
| 2007/0039687 | A1 | 2/2007 | Hamilton et al. |
| 2007/0046432 | A1 | 3/2007 | Aiouaz et al. |
| 2007/0052613 | A1 | 3/2007 | Gallschuetz et al. |
| 2007/0060075 | A1 | 3/2007 | Mikuteit |
| 2007/0085685 | A1 | 4/2007 | Phaneuf et al. |
| 2007/0109129 | A1 | 5/2007 | Sundstrom et al. |
| 2007/0126584 | A1 | 6/2007 | Hyde et al. |
| 2007/0136583 | A1 | 6/2007 | Diorio et al. |
| 2007/0136584 | A1 | 6/2007 | Diorio et al. |
| 2007/0136585 | A1 | 6/2007 | Diorio et al. |
| 2007/0141760 | A1 | 6/2007 | Ferguson et al. |
| 2007/0144662 | A1 | 6/2007 | Armijo et al. |
| 2007/0152073 | A1 | 7/2007 | Esterberg |
| 2007/0156281 | A1 | 7/2007 | Leung et al. |
| 2007/0164851 | A1 | 7/2007 | Cooper |
| 2007/0171129 | A1 | 7/2007 | Coleman et al. |
| 2007/0172966 | A1 | 7/2007 | Hyde et al. |
| 2007/0177738 | A1 | 8/2007 | Diorio et al. |
| 2007/0180009 | A1 | 8/2007 | Gutnik |
| 2007/0216533 | A1 | 9/2007 | Hyde et al. |
| 2007/0218571 | A1 | 9/2007 | Stoughton et al. |
| 2007/0220737 | A1 | 9/2007 | Stoughton et al. |
| 2007/0221737 | A2 | 9/2007 | Diorio et al. |
| 2007/0236331 | A1 | 10/2007 | Thompson et al. |
| 2007/0236335 | A1 | 10/2007 | Aiouaz et al. |
| 2007/0241762 | A1 | 10/2007 | Varpula et al. |
| 2007/0296590 | A1 | 12/2007 | Diorio et al. |
| 2007/0296603 | A1 | 12/2007 | Diorio et al. |
| 2008/0006702 | A2 | 1/2008 | Diorio et al. |
| 2008/0018489 | A1 | 1/2008 | Kruest et al. |
| 2008/0024273 | A1 | 1/2008 | Kruest et al. |
| 2008/0030342 | A1 | 2/2008 | Elizondo et al. |
| 2008/0046492 | A1 | 2/2008 | Sundstrom |
| 2008/0048833 | A1 | 2/2008 | Oliver |
| 2008/0048867 | A1 | 2/2008 | Oliver et al. |
| 2008/0084275 | A1 | 4/2008 | Azevedo et al. |
| 2008/0094214 | A1 | 4/2008 | Azevedo et al. |
| 2008/0136602 | A1 | 6/2008 | Ma et al. |
| 2008/0180217 | A1 | 7/2008 | Isabell |
| 2008/0180255 | A1 | 7/2008 | Isabell |
| 2008/0197978 | A1 | 8/2008 | Diorio et al. |
| 2008/0197979 | A1 | 8/2008 | Enyedy et al. |
| 2008/0204195 | A1 | 8/2008 | Diorio et al. |
| 2008/0232883 | A1 | 9/2008 | Klein et al. |
| 2008/0232894 | A1 | 9/2008 | Neuhard |
| 2008/0258878 | A1 | 10/2008 | Dietrich et al. |
| 2008/0258916 | A1 | 10/2008 | Diorio et al. |
| 2008/0266098 | A1 | 10/2008 | Aiouaz et al. |
| 2008/0297421 | A1 | 12/2008 | Kriebel et al. |
| 2008/0314990 | A1 | 12/2008 | Rietzler |
| 2008/0315992 | A1 | 12/2008 | Forster |
| 2009/0002132 | A1 | 1/2009 | Diorio et al. |
| 2009/0015382 | A1 | 1/2009 | Greefkes |
| 2009/0027173 | A1 | 1/2009 | Forster |
| 2009/0033495 | A1 | 2/2009 | Abraham et al. |
| 2009/0038735 | A1 | 2/2009 | Kian |
| 2009/0091424 | A1 | 4/2009 | Rietzler |
| 2009/0123704 | A1 | 5/2009 | Shafran et al. |
| 2009/0146785 | A1 | 6/2009 | Forster |
| 2009/0184824 | A1 | 7/2009 | Forster |
| 2009/0189770 | A1 | 7/2009 | Wirrig et al. |
| 2009/0194588 | A1 | 8/2009 | Blanchard et al. |
| 2009/0200066 | A1 | 8/2009 | Vicard et al. |
| 2009/0212919 | A1 | 8/2009 | Selgrath et al. |
| 2009/0237220 | A1 | 9/2009 | Oliver et al. |
| 2009/0251293 | A1 | 10/2009 | Azevedo et al. |
| 2010/0032900 | A1 | 2/2010 | Wilm |
| 2010/0033297 | A1 | 2/2010 | Patovirta |
| 2010/0050487 | A1 | 3/2010 | Weightman et al. |
| 2010/0060456 | A1 | 3/2010 | Forster |
| 2010/0060459 | A1 | 3/2010 | Stole et al. |
| 2010/0079286 | A1 | 4/2010 | Phaneuf |
| 2010/0079287 | A1 | 4/2010 | Forster et al. |
| 2010/0079290 | A1 | 4/2010 | Phaneuf |
| 2010/0126000 | A1 | 5/2010 | Forster |
| 2010/0155492 | A1 | 6/2010 | Forster |
| 2010/0156640 | A1 | 6/2010 | Forster |
| 2010/0182129 | A1 | 7/2010 | Hyde et al. |
| 2010/0226107 | A1 | 9/2010 | Rietzler |

(56) References Cited

U.S. PATENT DOCUMENTS

2010/0245182 A1 9/2010 Vicard et al.
2010/0259392 A1 10/2010 Chamandy et al.
2010/0270382 A1 10/2010 Koepp et al.
2011/0000970 A1 1/2011 Abraham
2011/0062236 A1 3/2011 Kriebel et al.
2011/0114734 A1 5/2011 Tiedmann et al.
2011/0121082 A1 5/2011 Phaneuf
2011/0121972 A1 5/2011 Phaneuf et al.
2011/0155811 A1 6/2011 Rietzler
2011/0155813 A1 6/2011 Forster
2011/0160548 A1 6/2011 Forster
2011/0163849 A1 7/2011 Kruest et al.
2011/0163879 A1 7/2011 Kruest et al.
2011/0175735 A1 7/2011 Forster
2011/0185607 A1 8/2011 Forster et al.
2011/0253794 A1 10/2011 Koskelainen
2011/0256357 A1 10/2011 Forster
2011/0267254 A1 11/2011 Semar et al.
2011/0285511 A1 11/2011 Maguire et al.
2011/0289023 A1 11/2011 Forster et al.
2011/0289647 A1 12/2011 Chiao et al.
2011/0303751 A1* 12/2011 Lai .................. G06K 19/07758 112/475.08
2011/0307309 A1 12/2011 Forster et al.
2012/0019358 A1 1/2012 Azevedo et al.
2012/0038461 A1 2/2012 Forster
2012/0050011 A1 3/2012 Forster
2012/0061473 A1 3/2012 Forster et al.
2012/0118975 A1 5/2012 Forster
2012/0154121 A1 6/2012 Azevedo et al.
2012/0164405 A1 6/2012 Webb et al.
2012/0173440 A1 7/2012 Dehlinger et al.
2012/0175621 A1 7/2012 Backlund et al.
2012/0182147 A1 7/2012 Forster
2012/0234921 A1 9/2012 Tiedmann et al.
2012/0235870 A1 9/2012 Forster
2012/0261477 A1 10/2012 Elizondo et al.
2012/0274448 A1 11/2012 Marcus et al.
2012/0279100 A1 11/2012 Burout et al.
2012/0290440 A1 11/2012 Hoffman et al.
2012/0292399 A1 11/2012 Launiainen
2013/0059534 A1 3/2013 Sobalvarro et al.
2013/0075481 A1 3/2013 Raymond et al.
2013/0082113 A1 4/2013 Cooper
2013/0092742 A1 4/2013 Brun et al.
2013/0105586 A1 5/2013 Sykkö et al.
2013/0107042 A1 5/2013 Forster
2013/0113627 A1 5/2013 Tiedmann
2013/0135080 A1 5/2013 Virtanen
2013/0135104 A1 5/2013 Nikkanen
2013/0141222 A1 6/2013 Garcia
2013/0161382 A1 6/2013 Bauer et al.
2013/0163640 A1 6/2013 Aiouaz et al.
2013/0265139 A1 10/2013 Nummila et al.
2013/0277432 A1 10/2013 Katworapattra et al.
2013/0285795 A1 10/2013 Virtanen et al.
2013/0291375 A1 11/2013 Virtanen et al.
2014/0070010 A1 3/2014 Diorio et al.
2014/0070923 A1 3/2014 Forster et al.
2014/0073071 A1 3/2014 Diorio et al.
2014/0084460 A1 3/2014 Nieland et al.
2014/0103119 A1 4/2014 Elizondo et al.
2014/0111314 A1 4/2014 Rietzler
2014/0144992 A1 5/2014 Diorio et al.
2014/0158777 A1 6/2014 Gladstone
2014/0191043 A1 7/2014 Forster
2014/0207670 A1* 7/2014 Matotek ............. G06Q 20/3224 705/41
2014/0209694 A1 7/2014 Forster
2014/0232544 A1* 8/2014 Yang .................. G08B 13/2434 427/208.2
2014/0263655 A1 9/2014 Forster
2014/0263659 A1 9/2014 Kervinen et al.
2014/0266633 A1 9/2014 Marcus
2014/0317909 A1 10/2014 Virtanen
2015/0022323 A1 1/2015 Kruest et al.
2015/0024523 A1 1/2015 Virtanen
2015/0032569 A1 1/2015 Stromberg
2015/0048170 A1 2/2015 Forster
2015/0076238 A1 3/2015 Koskelainen
2015/0107092 A1 4/2015 Bashan et al.
2015/0115038 A1 4/2015 Kuschewski et al.
2015/0181696 A1 6/2015 Elizondo et al.
2015/0227832 A1 8/2015 Diorio et al.
2015/0235062 A1 8/2015 Greefkes
2015/0248604 A1 9/2015 Diorio et al.
2015/0262053 A1 9/2015 Buehler
2015/0328871 A1 11/2015 de Castro
2015/0351689 A1 12/2015 Adams et al.
2015/0353292 A1 12/2015 Roth
2015/0356395 A1 12/2015 Haring et al.
2016/0019452 A1 1/2016 Forster
2016/0027022 A1 1/2016 Benoit et al.
2016/0034728 A1 2/2016 Oliver et al.
2016/0042206 A1 2/2016 Pesavento
2016/0137396 A1 5/2016 Brownfield
2016/0154618 A1 6/2016 Duckett
2016/0157348 A1 6/2016 Elizondo et al.
2016/0162776 A1 6/2016 Kruest et al.
2016/0172742 A1 6/2016 Forster
2016/0172743 A1 6/2016 Forster
2016/0189020 A1 6/2016 Duckett et al.
2016/0203395 A1 7/2016 Huhtasalo
2016/0210547 A1* 7/2016 Dekeyser ............... G06K 7/065
2016/0214422 A1 7/2016 Deyoung et al.
2016/0233188 A1 8/2016 Kriebel et al.
2016/0253732 A1 9/2016 Brown
2016/0321479 A1 11/2016 Uhl et al.
2016/0336198 A1 11/2016 Singleton et al.
2016/0342821 A1 11/2016 Nyalamadugu et al.
2016/0342883 A1 11/2016 Huhtasalo
2016/0364589 A1 12/2016 Roth
2017/0011664 A1 1/2017 Forster et al.
2017/0068882 A1 3/2017 Elizondo et al.
2017/0091498 A1 3/2017 Forster et al.
2017/0098393 A1 4/2017 Duckett et al.
2017/0124363 A1 5/2017 Rietzler
2017/0161601 A1 6/2017 Sevaux
2017/0169263 A1 6/2017 Kohler et al.
2017/0235982 A1 8/2017 Kruest et al.
2017/0243032 A1 8/2017 Pesavento et al.
2017/0286819 A9 10/2017 Huhtasalo
2017/0305068 A1 10/2017 Caldwell et al.
2017/0364716 A1 12/2017 Huhtasalo et al.
2018/0025601 A1* 1/2018 Gao ..................... G08B 13/246 340/572.1
2018/0032774 A1 2/2018 Kruest et al.
2018/0096176 A1 4/2018 Greefkes
2018/0101759 A1 4/2018 Forster
2018/0121690 A1 5/2018 Forster et al.
2018/0123220 A1 5/2018 Forster
2018/0137314 A1 5/2018 Roth
2018/0157873 A1 6/2018 Roth
2018/0157874 A1 6/2018 Huhtasalo et al.
2018/0157879 A1 6/2018 Forster
2018/0165485 A1 6/2018 Martinez De Velasco Cortina et al.
2018/0268175 A1 9/2018 Rietzler
2018/0336383 A1 11/2018 Roth
2019/0026616 A1 1/2019 Bourque et al.
2019/0057289 A1 2/2019 Bauer et al.
2019/0087705 A1 3/2019 Bourque et al.
2019/0147773 A1 5/2019 Cockerell
2019/0205724 A1 7/2019 Roth
2019/0220724 A1 7/2019 Huhtasalo
2019/0244072 A1 8/2019 Forster
2019/0251411 A1 8/2019 Gire et al.
2019/0266464 A1 8/2019 Forster
2019/0389613 A1 12/2019 Colarossi
2019/0391560 A1 12/2019 Arene et al.
2020/0006840 A1 1/2020 Forster
2020/0051463 A1 2/2020 Melo
2020/0126454 A1 4/2020 Sevaux
2020/0134408 A1 4/2020 Law

(56) References Cited

U.S. PATENT DOCUMENTS

| | | | |
|---|---|---|---|
| 2020/0151401 | A1 | 5/2020 | Dyche et al. |
| 2020/0160142 | A1 | 5/2020 | Roth |
| 2020/0193260 | A1 | 6/2020 | Forster |
| 2020/0193261 | A1 | 6/2020 | de Backer |
| 2020/0193455 | A1 | 6/2020 | Hoffman et al. |
| 2020/0202294 | A1 | 6/2020 | Duckett et al. |
| 2020/0207116 | A1 | 7/2020 | Raphael et al. |
| 2020/0249109 | A1 | 8/2020 | Singleton et al. |
| 2020/0265446 | A1 | 8/2020 | Vargas |
| 2020/0335475 | A1 | 10/2020 | Rolland et al. |
| 2020/0381829 | A1 | 12/2020 | Andia Vera et al. |
| 2020/0394697 | A1 | 12/2020 | Paolella et al. |
| 2021/0215562 | A1 | 7/2021 | Boellaard et al. |
| 2021/0241063 | A1 | 8/2021 | Thirappa et al. |
| 2021/0312471 | A1 | 10/2021 | Iyer |
| 2022/0012439 | A1 | 1/2022 | Duckett et al. |
| 2022/0171951 | A1 | 6/2022 | Vargas et al. |
| 2022/0180014 | A1 | 6/2022 | Barr et al. |
| 2022/0196500 | A1 | 6/2022 | Singleton et al. |
| 2022/0215353 | A1 | 7/2022 | Duckett |
| 2022/0230134 | A1 | 7/2022 | Pursell et al. |
| 2022/0269919 | A1 | 8/2022 | de Backer |
| 2022/0277152 | A1 | 9/2022 | Forster |
| 2022/0284253 | A1 | 9/2022 | Garcia et al. |
| 2022/0318532 | A1 | 10/2022 | Roth |
| 2022/0358337 | A1 | 11/2022 | Diorio et al. |
| 2022/0358339 | A1 | 11/2022 | Forster et al. |
| 2022/0358340 | A1 | 11/2022 | Sowle et al. |
| 2022/0391654 | A1 | 12/2022 | Forster |
| 2022/0398424 | A1 | 12/2022 | Forster |
| 2022/0398425 | A1 | 12/2022 | Roth |
| 2022/0414356 | A1 | 12/2022 | Roth |
| 2022/0414411 | A1 | 12/2022 | Forster |

FOREIGN PATENT DOCUMENTS

| | | | |
|---|---|---|---|
| CN | 202422180 | U | 9/2012 |
| CN | 103080392 | A | 5/2013 |
| CN | 104781857 | A | 7/2015 |
| CN | 110326100 | A | 10/2019 |
| CN | 110945716 | A | 3/2020 |
| DE | 102006051379 | A1 | 4/2008 |
| DE | 102007001411 | A1 | 7/2008 |
| EP | 2057687 | A1 | 5/2009 |
| EP | 2158604 | A2 | 3/2010 |
| EP | 2585628 | A1 | 5/2013 |
| EP | 3319168 | A1 | 5/2018 |
| EP | 3574521 | A1 | 12/2019 |
| EP | 3662534 | A1 | 6/2020 |
| EP | 3923195 | A1 | 12/2021 |
| FR | 2905518 | A1 | 3/2008 |
| FR | 2917895 | A1 | 12/2008 |
| FR | 2961947 | A1 | 12/2011 |
| FR | 3058579 | A1 | 5/2018 |
| FR | 3062515 | A1 | 8/2018 |
| FR | 3069962 | A1 | 2/2019 |
| FR | 3078980 | A1 | 9/2019 |
| FR | 3103043 | A1 | 5/2021 |
| FR | 3103044 | A1 | 5/2021 |
| FR | 3103630 | A1 | 5/2021 |
| JP | 2010502030 | A | 1/2010 |
| JP | 2010530630 | A | 9/2010 |
| JP | 5059110 | B2 | 10/2012 |
| JP | 2013529807 | A | 7/2013 |
| JP | 5405457 | B2 | 2/2014 |
| JP | 5815692 | B2 | 11/2015 |
| JP | 2020505714 | A | 2/2020 |
| WO | 2007104634 | A1 | 9/2007 |
| WO | 2008025889 | A1 | 3/2008 |
| WO | 2009004243 | A2 | 1/2009 |
| WO | 2011161336 | A1 | 12/2011 |
| WO | 2018138437 | A1 | 8/2018 |
| WO | 2019025683 | A1 | 2/2019 |
| WO | 2019175509 | A1 | 9/2019 |

* cited by examiner

ELONGATE FLEXIBLE TAG

CROSS-REFERENCE TO RELATED APPLICATIONS

This application is a continuation of U.S. patent application Ser. No. 17/057,503 filed on Apr. 1, 2021, and the contents is incorporated by reference herein in its entirety.

BACKGROUND

Statement of the Technical Field

The present disclosure generally concerns security tag based systems. More particularly, the present disclosure relates to systems and methods for providing and using elongated flexible tags.

Description of the Related Art

Current market solutions usually require some sizable tag to be attached to an article (e.g., a garment) in order to secure the same for use in an Electronic Article Surveillance ("EAS") system. With the push by many customers to incorporate less obtrusive, smaller solutions and the increasing importance of a Radio Frequency Identification ("RFID") technology for retail logistics in particular, there have been innovations in electronic thread technologies. Many customers have tried to embed such electronic thread technologies in their articles (e.g., garments) but have realized the overhead and burden this can place on their front end manufacturing process.

SUMMARY

The present disclosure generally concerns implementing systems and methods for operating a tag. The tag comprises receiving a wireless signal including a command at an electronic thread device integrated into a flexible elongate structure of the tag (e.g., a cord or cable). The electronic thread device comprises an antenna and an Integrated Circuit ("IC"). The electronic thread device is configured to: authenticate the command; and cause at least one of an actuation of a detachment mechanism of the tag, a heating of a heat sensitive material of the tag, and a deactivation of a communication operation of the tag, in response to an authentication of the command. In the case of loss prevention or EAS technologies, a tag may also comprise a non-deactivatable element (e.g., RF or AM resonators).

In some scenarios, the flexible elongate structure comprises a fabric layer an which the electronic thread device is disposed on or to which the electronic thread device is placed adjacent or coupled. A battery may be printed on the fabric layer for supplying power to the electronic thread device. Alternatively, a trace is formed on the fabric layer that connects the electronic thread device to an external power source located in the tag's body.

The flexible elongate structure may further comprise a protective sleeve to prevent damage to the fabric layer and electronic thread device. The electronic thread device may be compressed between the protective sleeve and the fabric layer.

In those or other scenarios, an EAS component is also integrated into a flexible elongate structure of the tag. The EAS component may comprise a magnetic material disposed in a core layer of the tag's flexible elongate structure and a coil wrapped around at least one of the magnetic material and a fabric layer of the tag's flexible elongate structure. Alternatively, the EAS component comprises a resonator and bias element, or an RFID chip (passive or active).

BRIEF DESCRIPTION OF THE DRAWINGS

The present solution will be described with reference to the following drawing figures, in which like numerals represent like items throughout the figures.

DETAILED DESCRIPTION

Figure 1:
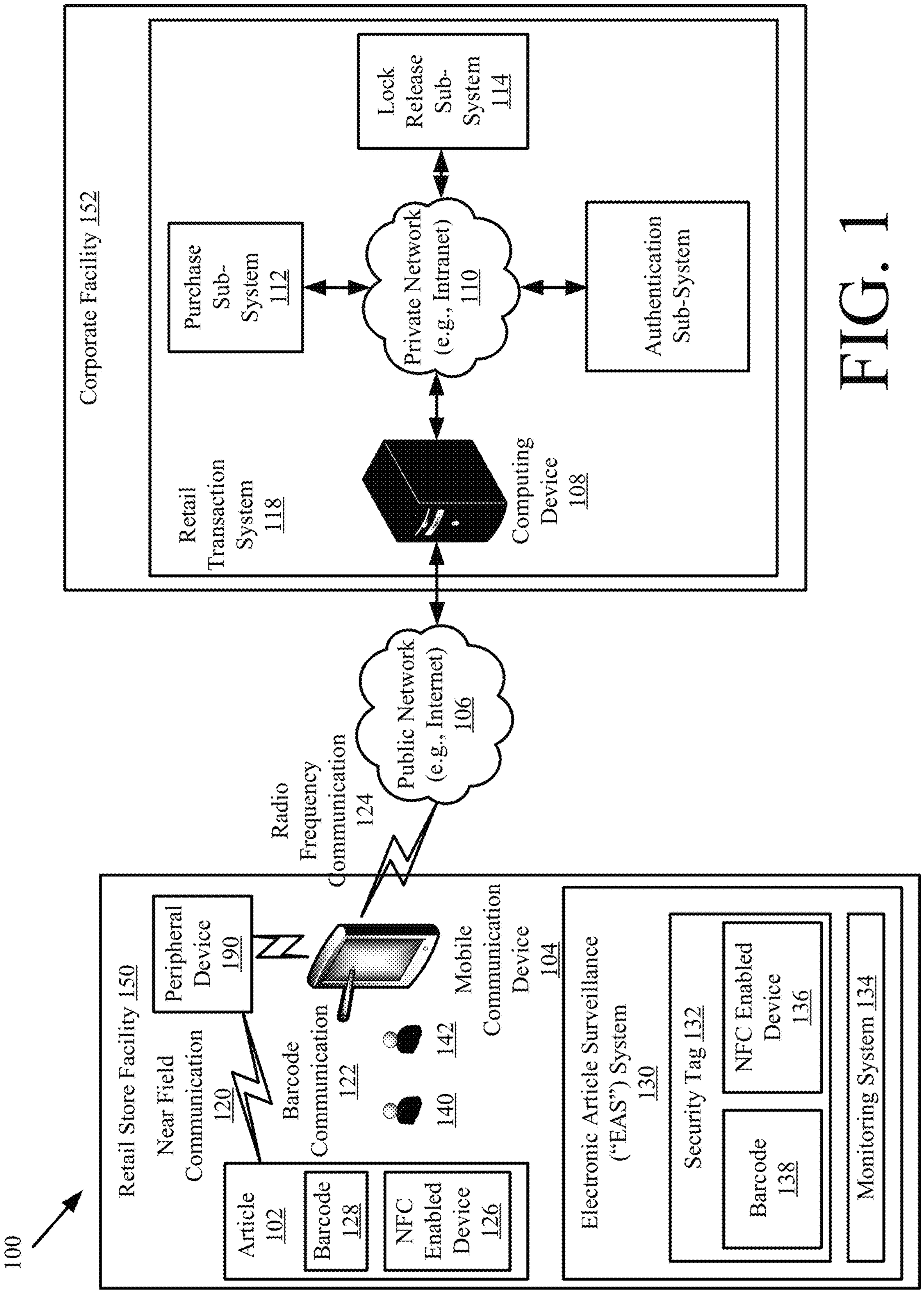
FIG. 1 is an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects as illustrative. The scope of the invention is, therefore, indicated by the appended claims. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution will now be described. The present solution generally relates to systems and methods for providing and using an elongate flexible tag. The tag can be an Electronic Article Surveillance ("EAS") enabled tag, a Radio Frequency Identification ("RFID") enabled tag, a Short Range Communications ("SRC") tag, or a Near Field Communication ("NFC") enabled tag. As such, the tag can be used in EAS systems, RFID systems, SRC systems and/or NFC systems for facilitating with inventory management and security.

The elongate flexible tags are designed to replace traditional RFID inlays and tags. In this regard, the elongate flexible tags comprise thread technologies (e.g., RFID—coupled e-thread technology). Such technology is embedded in an elongate flexible structure, such as a cord (e.g., a lanyard, rope, or string) or a cable (e.g., a lanyard or zip tie). The embedded technology takes advantage of an electronic thread (or e-thread) as a transmitting and receiving medium to communicate with external devices (e.g., an RFID enabled device and/or a Point Of Sale ("POS") device). In this regard, the e-thread comprises an antenna connected to a communications enabled component (e.g., an RFID, SRC or NFC enabled chip). The communications enabled component can be passive or active. In the passive scenarios, the communication enabled component is configured to derive power from RF energy. In the active scenarios, a battery is provided to power the communications enabled component. The battery can be printed on a fabric of the elongate flexible structure, or alternatively provided in the tag body.

The communications feature of the elongate flexible tags facilitate self-checkout in retail applications. In the self-checkout scenarios, the mobile POS device is provided with a peripheral device to decouple the security tags from articles or deactivate the security tags (e.g., when a successful purchase of the articles has been made. The peripheral device may include an insert space in which the mobile POS device can be at least partially disposed such that the peripheral device may wrap around at least a portion of the mobile POS device. Such coupling configurations allow the mobile POS device and the peripheral device to be easily carried or worn by a user or vehicle.

The mobile POS device has an application and/or plug-in installed thereon which is operative to facilitate the control of the peripheral device. During operation, the mobile POS device receives a request to detach a security tag from an article. A message is then communicated from the mobile POS device to the peripheral device via a first short range communication (e.g., a Bluetooth communication). The message is generally configured to cause the peripheral device to perform operations to facilitate a detachment of the security tag from the article. Thereafter, a signal is communicated from the peripheral device to the security tag for causing an actuation of a detachment mechanism of the security tag. The detachment mechanism can include, but is not limited to, an electro-mechanical detachment mechanism or a magneto-mechanical detachment mechanism. The mechanical detachment portion of the detachment mechanism may include, but is not limited to, a pin, a lanyard, and/or an adhesive.

Illustrative Tag Based System

Referring now to FIG. 1, there is provided an illustration of an illustrative system 100 employing the elongate flexible security tags of the present solution. System 100 is generally configured to allow a customer to purchase an article 102 using a Mobile Communication Device ("MCD") 104 and a Peripheral Device ("PD") 190 thereof. PD 190 is designed to be mechanically attached to the MCD 104. In some scenarios, PD 190 wraps around at least a portion of MCD 104. Communications between MCD 104 and PD 190 are achieved using a wireless Short Rage Communication ("SRC") technology, such as a Bluetooth technology. PD 190 also employs other wireless SRC technologies to facilitate the purchase of article 102. The other wireless SRC technologies can include, but are not limited to, NFC technology, InfRared ("IR") technology, Wireless Fidelity ("Wi-Fi") technology, RFID technology, and/or ZigBee technology. PD 190 may also employ barcode technology, electronic card reader technology, and Wireless Sensor Network ("WSN") communications technology.

As shown in FIG. 1, system 100 comprises a Retail Store Facility ("RSF") 150 including an EAS system 130. The EAS system 130 comprises a monitoring system 134 and at least one security tag 132. Although not shown in FIG. 1, the security tag 132 is attached to article 102, thereby protecting the article 102 from an unauthorized removal from RSF 150. The monitoring system 134 establishes a surveillance zone (not shown) within which the presence of the security tag 132 can be detected. The surveillance zone is established at an access point (not shown) of RSF 150. If the security tag 132 is carried into the surveillance zone, then an alarm is triggered to indicate a possible unauthorized removal of article 102 from the RSF 150.

During store hours, a customer 140 may desire to purchase the article 102. The customer 140 can purchase the article 102 without using a traditional fixed POS station (e.g., a checkout counter). Instead, the purchase transaction can be achieved using MCD 104 and PD 190, as mentioned above. MCD 104 (e.g., a tablet computer) can be in the possession of the customer 140 or store associate 142 at the time of the purchase transaction. An illustrative architecture of MCD 104 will be described below in relation to FIG. 3. An illustrative architecture of PD 190 will be described below in relation to FIG. 4. Still, it should be understood that MCD 104 has a retail transaction application installed thereon that is configured to facilitate the purchase of article 102 and the management/control of PD 190 operations for an attachment/detachment of the security tag 132 to/from article 102. The retail transaction application can be a pre-installed application, an add-on application or a plug-in application.

In order to initiate a purchase transaction, the retail transaction application is launched via a user-software interaction. The retail transaction application facilitates the exchange of data between the article 102, security tag 132, customer 140, store associate 142, and/or Retail Transaction System ("RTS") 118. For example, after the retail transaction application is launched, a user 140, 142 is prompted to start a retail transaction process for purchasing the article 102. The retail transaction process can be started simply by performing a user software interaction, such as depressing a key on a keypad of the MCD 104 or touching a button on a touch screen display of the MCD 104.

Subsequently, the user 140, 142 may manually input into the retail transaction application article information. Alternatively or additionally, the user 140, 142 places the MCD 104 in proximity of article 102. As a result of this placement, the PD 190 obtains article information from the article 102. The article information includes any information that is useful for purchasing the article 102, such as an article identifier and an article purchase price. In some scenarios, the article information may even include an identifier of the security tag 132 attached thereto. The article information can be communicated from the article 102 to the PD 190 via a short range communication, such as a barcode communication 122 or an NFC 120.

In the barcode scenario, article 102 has a barcode 128 attached to an exposed surface thereof. The term "barcode", as used herein, refers to a pattern or symbol that contains embedded data. Barcodes may include, for example, one-dimensional barcodes, two dimensional barcodes (such as matrix codes, Quick Response ("QR") codes, Aztec codes and the like), or three-dimensional bar codes. The embedded data can include, but is not limited to, a unique identifier of the article 102 and/or a purchase price of article 102. The barcode 128 is read by a barcode scanner/reader (not shown in FIG. 1) of the PD 190. Barcode scanners/readers are well known in the art. Any known or to be known barcode scanner/reader can be used herein without limitation.

In the NFC scenarios, article 102 may comprise an NFC enabled device 126. The NFC enabled device 126 can be separate from security tag 132 or comprise security tag 132. An NFC communication 120 occurs between the NFC enabled device 126 and the PD 190 over a relatively small distance (e.g., N centimeters or N inches, where N is an integer such as twelve). The NFC communication 120 may be established by touching components 126, 190 together or bringing them in close proximity such that an inductive coupling occurs between inductive circuits thereof. In some scenarios, the NFC operates at 13.56 MHz and at rates ranging from 106 kbit/s to 848 kbit/s. The NFC may be achieved using NFC transceivers configured to enable contactless communication at 13.56 MHz. NFC transceivers are well known in the art, and therefore will not be described in detail herein. Any known or to be known NFC transceivers can be used herein without limitation.

After the PD 190 obtains the article information, it forwards it to MCD 104 via a wireless SRC, such as a Bluetooth communication. Thereafter, payment information is input into the retail transaction application of MCD 104 by the user 140, 142. The payment information can include, but is not limited to, a customer loyalty code, payment card information, and/or payment account information. The payment information can be input manually, via an electronic card reader (e.g., a magnetic strip card reader), or via a barcode reader. Electronic card readers and barcode readers are well known in the art, and therefore will not be described herein. Any known or to be known electronic card reader and/or barcode reader can be used herein without limitation. The payment information can alternatively or additionally be obtained from a remote data store based on a customer identifier or account identifier. In this case, the payment information can be retrieved from stored data associated with a previous sale of an article to the customer 140.

Upon obtaining the payment information, the MCD 104 automatically performs operations for establishing a retail transaction session with the RTS 118. The retail transaction session can involve: communicating the article information and payment information from MCD 104 to the RTS 118 via an RF communication 124 and public network 106 (e.g., the Internet); completing a purchase transaction by the RTS 118; and communicating a response message from the RTS 118 to MCD 104 indicating that the article 102 has been successfully or unsuccessfully purchased. The purchase transaction can involve using an authorized payment system, such as a bank Automatic Clearing House ("ACH") payment system, a credit/debit card authorization system, or a third party system (e.g., PayPal®, SolidTrust Pay® or Google Wallet®).

Notably, the communications between MCD 104 and computing device 108 may be secure communications in which cryptography is employed. In such scenarios, a cryptographic key can also be communicated from MCD 104 to RTS 118, or vice versa. The cryptographic key can be a single use cryptographic key. Any type of cryptography can be employed herein without limitation.

The purchase transaction can be completed by the RTS 118 using the article information and payment information. In this regard, such information may be received by a computing device 108 of the RTS 118 and forwarded thereby to a sub-system of a private network 100 (e.g., an Intranet). For example, the article information and purchase information can also be forwarded to and processed by a purchase sub-system 112 to complete a purchase transaction. When the purchase transaction is completed, a message is generated and sent to the MCD 104 indicating whether the article 102 has been successfully or unsuccessfully purchased.

If the article 102 has been successfully purchased, then a security tag detaching process can be started automatically by the RTS 118 or by the MCD 104. Alternatively, the user 140, 142 can start the security tag detaching process by performing a user-software interaction using the MCD 104. In some scenarios, a kill or temporary disable command is sent to the tag for disabling some or all operation of the same subsequent to purchase validation. The kill or temporary disable command can be sent from the MCD 104. The present solution is not limited in this regard. Other software controlled operations can be employed to achieve the same or similar end. In other scenarios, the article information is forwarded to and processed by a lock release sub-system 114 to retrieve a detachment key or a detachment code that is useful for detaching the security tag 132 from the article 102. The detachment key or code is then sent from the RTS 118 to the MCD 104 such that the MCD 104 can cause the PD 190 to perform tag detachment operations. The tag detachment operations of PD 190 are generally configured to cause the security tag 132 to actuate a detaching mechanism (not shown in FIG. 1). In this regard, the PD 190 generates a detach command and sends a wireless detach signal including the detach command to the security tag 132. The security tag 132 authenticates the detach command and activates the detaching mechanism. For example, the detach command causes a pin to be released, a lanyard to be released, a temperature sensitive material (e.g., plastic) to be heated, an electrical trace to be heated, and/or an adhesive to be heated such that the security tag can be detached from the article 102. The adhesive may be heated via current heating and/or via RF heating. Once the security tag 132 has been detached from article 102, the customer 140 can carry the article 102 through the surveillance zone without setting off the alarm.

Alternatively or additionally in all three security tag detaching scenarios, the MCD 104 may prompt the user 140, 142 to obtain a unique identifier (not shown in FIG. 1) for the security tag 132. The unique identifier can be obtained manually from user 140, 142 or via a wireless communication, such as a barcode communication or an NFC communication.

In the barcode scenario, security tag 132 has a barcode 138 attached to an exposed surface thereof. The barcode comprises a pattern or symbol that contains embedded data. The embedded data can include, but is not limited to, a unique identifier of the security tag 132 and/or a unique identifier of the article 102 being secured thereby. The barcode 138 is read by a barcode scanner/reader (not shown in FIG. 1) of the PD 190.

In the NFC scenario, security tag 132 may comprise an NFC enabled device 136. An NFC communication (not shown in FIG. 1) occurs between the NFC enabled device 136 and the PD 190 over a relatively small distance (e.g., N centimeters or N inches, where N is an integer such as twelve). The NFC communication may be established by touching components 136, 190 together or bringing them in close proximity such that an inductive coupling occurs between inductive circuits thereof. The NFC may be achieved using NFC transceivers configured to enable contactless communication at 13.56 MHz.

Once the unique identifier for the security tag 132 has been obtained, PD 190 communicates the same to MCD 104. In turn, MCD 104 communicates the unique identifier to the RTS 118 via network 106 (e.g., the Internet or a mobile phone network) and RF communication 124. At the RTS 118, the unique identifier is processed for various reasons. In this regard, the unique identifier may be received by computing device 108 and forwarded thereby to the lock release sub-system 114 to retrieve the detachment key or code that is useful for detaching the security tag 132 from article 102. The detachment key or code is then sent from the RTS 118 to the MCD 104. The MCD 104 forwards the detachment key or code to PD 190 such that the PD 190 can cause the security tag 132 to actuate a detaching mechanism (not shown in FIG. 1) in the same manner as described above.

In view of the forgoing, lock release sub-system 114 can comprise a data store in which detachment keys and/or detachment codes are stored in association with unique identifiers for a plurality of articles and/or security tags, respectively. Each detachment key can include, but is not limited to, at least one symbol selected for actuating a detaching mechanism of a respective security tag. In some scenarios, the detachment key can be a one-time-only use detachment key in which it enables the detachment of a security tag only once during a given period of time (e.g., N days, N weeks, N months, or N years, where N is an integer equal to or greater than 1). Each detachment code can include, but is not limited to, at least one symbol from which a detachment key can be derived or generated. The detachment key can be derived or generated by the MCD 104, the RTS 118, and/or PD 190. The detachment key and/or code can be stored in a secure manner within the MCD 104, PD 190 or the RTS 118, as will be discussed below. In the case that the key is generated by the MCD 104 or PD 190, the key generation operations are performed in a secure manner. For example, the algorithm for generating the key can be performed by a processor with a tamper-proof enclosure, such that if a person maliciously attempts to extract the algorithm from the processor the algorithm will be erased prior to any unauthorized access thereto.

Although FIG. 1 is shown as having two facilities (namely the retail store facility 150 and the corporate facility 152), the present invention is not limited in this regard. For example, the facilities 150, 152 can reside in the same or different building or geographic area. Alternatively or additionally, the facilities 150, 152 can be the same or different sub-parts of a larger facility. Also, the detachment key or code can be replaced with a deactivation key or code for deactivating the security tag 132, rather than detaching the security tag from the article. The deactivation can be achieved by disabling or deactivating at least communication operations of the tag. The communications operations can include, but are not limited to, RFID communication operations, SRC communication operations, NFC communications operations, and/or EAS operations. In some scenarios, at least the tag's ability to respond to interrogation signals is deactivated or disabled. The interrogation signal can be an RFID interrogation signal, an SRC interrogation signal, an NFC interrogation signal, or an EAS interrogation signal. Techniques for deactivating RFID, SRC, NFC and/or EAS communications operations of a tag are well known in the art, and therefore will not be described herein. Any known or to be known technique for deactivating RFID, SRC, NFC and/or EAS communications operations of a tag can be used herein without limitation.

Figure 2:
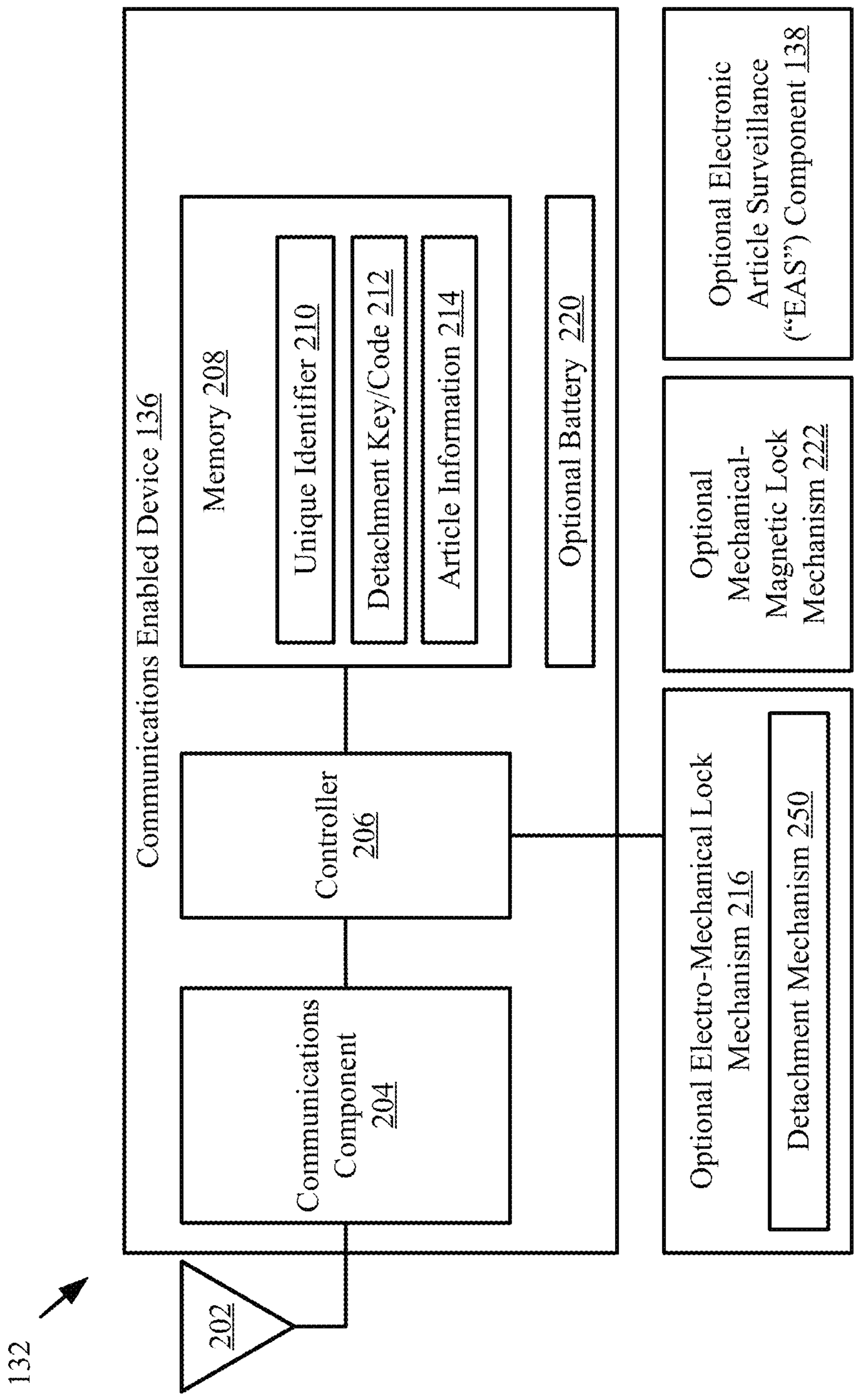
FIG. 2 is a block diagram of an illustrative architecture for a security tag shown in FIG. 1.

Referring now to FIG. 2, there is provided a schematic illustration of an illustrative architecture for security tag 132. Security tag 132 can include more or less components than that shown in FIG. 2. However, the components shown are sufficient to disclose an illustrative embodiment implementing the present solution. Some or all of the components of the security tag 132 can be implemented in hardware, software and/or a combination of hardware and software. The hardware includes, but is not limited to, one or more electronic circuits.

The hardware architecture of FIG. 2 represents an illustration of a representative security tag 132 configured to facilitate the prevention of an unauthorized removal of an article (e.g., article 102 of FIG. 1) from a retail store facility (e.g., RSF 150 of FIG. 1). In this regard, the security tag 132 can include an EAS component 138. EAS components are well known in the art, and therefore will not be described in detail here.

The security tag 132 also comprises an antenna 202 and a communications enabled device 136 for allowing data to be exchanged with the external device via RFID technology, SRC technology and/or NFC technology. The antenna 202 is configured to receive wireless signals from the external device and transmit wireless signals generated by the communications enabled device 136. The communications enabled device 136 comprises a communications component 204. The communications component can include, but is not limited to, an RFID transceiver, an SRC transceiver and/or an NFC transceiver. Such transceivers are well known in the art, and therefore will not be described herein. However, it should be understood that the communications component 204 processes received wireless signals to extract information therein. This information can include, but is not limited to, a request for certain information (e.g., a unique identifier 210), and/or a message including information specifying a detachment key/code or deactivation key/code for detaching/deactivating the security tag 132. The communications component 204 may pass the extracted information to the controller 206.

If the extracted information includes a request for certain information, then the controller 206 may perform operations to retrieve a unique identifier 210 and/or article information 214 from memory 208. The article information 214 can include a unique identifier of an article and/or a purchase price of the article. The retrieved information is then sent from the security tag 132 to a requesting external device (e.g., PD 190 of FIG. 1) via an NFC communication.

In contrast, if the extracted information includes information specifying a one-time-only use key and/or instructions for programming the security tag 132 to actuate a detachment mechanism 250 of an electro-mechanical lock mechanism 216, then the controller 206 may perform operations to simply actuate the detachment mechanism 250 using the one-time-only key. Alternatively or additionally, the controller 206 can:

(1) receive a kill or temporary disable command, and disable operations of the tag in response to the kill or temporary disable command; or (2) parse the information from a received message; retrieve a detachment key/code 212 from memory 208; and compare the parsed information to the detachment key/code to determine if a match exists therebetween.

If a match exists in scenario (2), then the controller 206 generates and sends a command to the electro-mechanical lock mechanism 216 for actuating the detachment mechanism 250. An auditory or visual indication can be output by the security tag 132 when the detachment mechanism 250 is actuated. If a match does not exist, then the controller 206 may generate a response message indicating that detachment key/code specified in the extracted information does not match the detachment key/code 212 stored in memory 208. The response message may then be sent from the security tag 132 to a requesting external device (e.g., PD 190 of FIG. 1) via a wireless communication.

Notably, the memory 208 may be a volatile memory and/or a non-volatile memory. For example, the memory 208 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 208 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

The electro-mechanical lock mechanism 216 is operable to actuate the detachment mechanism 250. The detachment mechanism 250 can include a lock configured to move between a lock state and an unlock state. Such a lock can include, but is not limited to, a pin or a lanyard. In some scenarios, the detachment mechanism 250 may additionally or alternatively comprise a temperature sensitive material (e.g., plastic), an electrical trace, and/or an adhesive that can be heated via current heating or RF heating. The electro-mechanical lock mechanism 216 is shown as being indirectly coupled to communications component 204 via controller 206. The present solution is not limited in this regard. The electro-mechanical lock mechanism 216 can additionally or alternatively be directly coupled to the communications component 204. One or more of the components 204, 206 can cause the lock of the detachment mechanism 250 to be transitioned between states in accordance with information received from an external device (e.g., PD 190 of FIG. 1). The components 204-208, 260 and a battery 220 may be collectively referred to herein as the communications enabled device 136.

The communications enabled device 136 can be incorporated into a device which also houses the electro-mechanical lock mechanism 216, or can be a separate device which is in direct or indirect communication with the electro-mechanical lock mechanism 216. The communications enabled device 136 is coupled to a power source. The power source may include, but is not limited to, battery 220. Alternatively or additionally, the NFC enabled device 136 is configured as a passive device which derives power from an RF signal inductively coupled thereto.

In some scenarios, a mechanical-magnetic lock mechanism 222 may additionally or alternatively be provided with the security tag 132. Mechanical-magnetic lock mechanisms are well known in the art, and therefore will not be described in detail herein. Still, it should be understood that such lock mechanisms are detached using magnetic and mechanical tools. These tools can be implemented by the externa device (e.g., PD 190 of FIG. 1).

Figure 3:
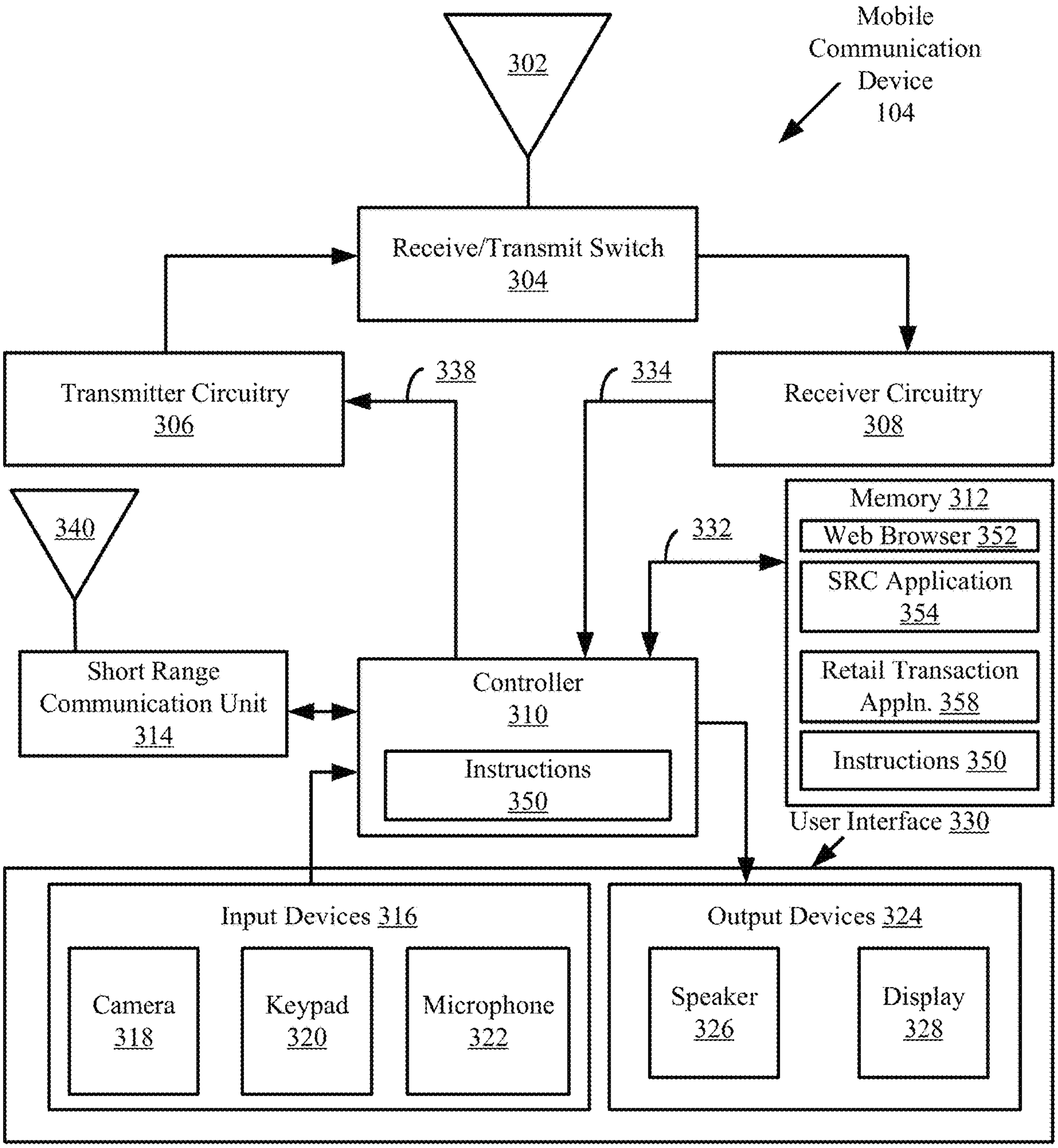
FIG. 3 is a block diagram of an illustrative architecture for a mobile communication device shown in FIG. 1.

Referring now to FIG. 3, there is provided a more detailed block diagram of an exemplary architecture for the MCD 104 of FIG. 1. In some scenarios, computing device 108 of FIG. 1 is the same as or similar to MCD 104. As such, the following discussion of MCD 104 is sufficient for understanding computing device 108 of FIG. 1.

MCD 104 can include, but is not limited to, a tablet computer, a notebook computer, a personal digital assistant, a cellular phone, or a mobile phone with smart device functionality (e.g., a Smartphone). MCD 104 may include more or less components than those shown in FIG. 3. However, the components shown are sufficient to disclose an illustrative embodiment implementing the present invention. Some or all of the components of the MCD 104 can be implemented in hardware, software and/or a combination of hardware and software. The hardware includes, but is not limited to, one or more electronic circuits.

The hardware architecture of FIG. 3 represents an illustration of a representative MCD 104 configured to facilitate the data exchange (a) between an article (e.g., article 102 of FIG. 1) and an RTS (e.g., an RTS 118 of FIG. 1) via short-range communication technology and/or mobile technology and (b) between a security tag (e.g., security tag 132 of FIG. 1) and the RTS via short-range communication technology and/or mobile technology. In this regard, MCD 104 comprises an antenna 302 for receiving and transmitting RF signals. A receive/transmit ("Rx/Tx") switch 304 selectively couples the antenna 302 to the transmitter circuitry 306 and receiver circuitry 308 in a manner familiar to those skilled in the art. The receiver circuitry 308 demodulates and decodes the RF signals received from a network (e.g., the network 106 of FIG. 1). The receiver circuitry 308 is coupled to a controller (or microprocessor) 310 via an electrical connection 334. The receiver circuitry 308 provides the decoded signal information to the controller 310. The controller 310 uses the decoded RF signal information in accordance with the function(s) of the MCD 104.

The controller 310 also provides information to the transmitter circuitry 306 for encoding and modulating information into RF signals. Accordingly, the controller 310 is coupled to the transmitter circuitry 306 via an electrical connection 338. The transmitter circuitry 306 communicates the RF signals to the antenna 302 for transmission to an external device (e.g., a node of a network 106 of FIG. 1) via the Rx/Tx switch 304.

An antenna 340 may be coupled to an SRC communication unit 314 for receiving SRC signals. In some scenarios, SRC communication unit 314 implements Bluetooth technology. As such, SRC communication unit 314 may comprise a Bluetooth transceiver. Bluetooth transceivers are well known in the art, and therefore will not be described in detail herein. However, it should be understood that the Bluetooth transceiver processes the Bluetooth signals to extract information therefrom. The Bluetooth transceiver may process the Bluetooth signals in a manner defined by an SRC application 354 installed on the MCD 104. The SRC application 354 can include, but is not limited to, a Commercial Off The Shelf ("COTS") application. The Bluetooth transceiver provides the extracted information to the controller 310. As such, the SRC communication unit 314 is coupled to the controller 310 via an electrical connection 336. The controller 310 uses the extracted information in accordance with the function(s) of the MCD 104. For example, the extracted information can be used by the MCD 104 to generate a request for a detachment key or code associated with a particular security tag (e.g., security tag 132 of FIG. 1) from an RTS (e.g., an RTS 118 of FIG. 1). Thereafter, the MCD 104 sends the request to the RTS via transmit circuitry 306 and antenna 302.

The controller 310 may store received and extracted information in memory 312 of the MCD 104. Accordingly, the memory 312 is connected to and accessible by the controller 310 through electrical connection 332. The memory 312 may be a volatile memory and/or a non-volatile memory. For example, the memory 312 can include, but is not limited, a RAM, a DRAM, an SRAM, a ROM and a flash memory. The memory 312 may also comprise unsecure memory and/or secure memory. The memory 212 can be used to store various other types of information therein, such as authentication information, cryptographic information, location information and various service-related information.

As shown in FIG. 3, one or more sets of instructions 350 are stored in memory 312. The instructions 350 may include customizable instructions and non-customizable instructions. The instructions 350 can also reside, completely or at least partially, within the controller 310 during execution thereof by MCD 104. In this regard, the memory 312 and the controller 310 can constitute machine-readable media. The term "machine-readable media", as used here, refers to a single medium or multiple media that stores one or more sets of instructions 350. The term "machine-readable media", as used here, also refers to any medium that is capable of storing, encoding or carrying the set of instructions 350 for execution by the MCD 104 and that causes the MCD 104 to perform one or more of the methodologies of the present disclosure.

The controller 310 is also connected to a user interface 330. The user interface 330 comprises input devices 316, output devices 324 and software routines (not shown in FIG. 3) configured to allow a user to interact with and control software applications (e.g., application software 352-356 and other software applications) installed on the MCD 104. Such input and output devices may include, but are not limited to, a display 328, a speaker 326, a keypad 320, a directional pad (not shown in FIG. 3), a directional knob (not shown in FIG. 3), a microphone 322 and a camera 318. The display 328 may be designed to accept touch screen inputs. As such, user interface 330 can facilitate a user-software interaction for launching applications (e.g., application software 352-356) installed on MCD 104. The user interface 330 can facilitate a user-software interactive session for writing data to and reading data from memory 312.

The display 328, keypad 320, directional pad (not shown in FIG. 3) and directional knob (not shown in FIG. 3) can collectively provide a user with a means to initiate one or more software applications or functions of the MCD 104. The application software 354-358 can facilitate the data exchange (a) between an article (e.g., article 102 of FIG. 1) and an RTS (e.g., an RTS 118 of FIG. 1) and (b) between a security tag (e.g., security tag 132 of FIG. 1) and the RTS. In this regard, the application software 354-358 performs one or more of the following: verify an identity of a user of the MCD 104 via an authentication process; present information to the user indicating that her/his identity has been or has not been verified; and/or determining if the user is within a particular area of a retail store in which s/he is authorized to use retail-related functions of the MCD 104. Such a determination can be achieved using a "keep alive" or "heart beat" signal which is received by the MCD 104 from the EAS system. The "keep alive" or "heart beat" signal can have a certain frequency, voltage, amplitude and/or information, which the MCD 104 may detect and compare with pre-stored values to determine if a match exists therebetween. If a match does or does not exist, then the MCD 104 will perform one or more pre-defined operations for enabling or disabling one or more functions thereof.

In some scenarios, the "keep alive" or "heart beat" signal can cause one or more operations of the MCD 104 to be enabled or disabled such that the user of the MCD 104 is allowed access to and use of retail-related functions in a controlled manner. For example, a store associate may be authorized to complete a purchase transaction of articles in an electronic department of a retail store, but not of items in a pharmacy of the retail store. Accordingly, retail-purchase transaction operations of the MCD 104 are enabled when the store associated is in the electronic department and disabled when the store associate is in the pharmacy. The "keep alive" or "heart beat" signal can also cause one or more operations of the MCD 104 to be enabled or disabled such that the MCD 104 will not operate if taken out of the store so as to prevent theft thereof.

The application software 354-358 can also perform one or more of the following: generate a list of tasks that a particular store associate is to perform; display the list to the store associate using the MCD 104; and/or dynamically update the list based on information received from the store associate, and EAS system, a security tag, and/or an RTS. For example, the list may include a plurality of asks: handle a customer in isle 7 of the grocery store; stock shelves in isle 9 of the grocery store; and/or lock/unlock a cabinet or a piece of equipment.

The application software 354-358 can further perform one or more of the following: present a Graphical User Interface ("GUI") to the user for enabling the user to initiate a retail transaction process for purchasing one or more articles (e.g., article 102 of FIG. 1); and/or present a GUI to the user for enabling the user to initiate a detachment process for detaching a security tag (e.g., security tag 132 of FIG. 1) from an article (e.g., article 102 of FIG. 1).

The retail transaction process can generally involve: prompting a user of the MCD 104 to manually input article information or prompting the user of the MCD 104 to place MCD with the PD 190 attached thereto in proximity to the article; obtaining the article information manually from the user or automatically from the article via short range communication (e.g., barcode communication or NFC communication) using the PD 190; prompting the user for payment information; obtaining payment information manually from the user of the MCD or automatically from a payment card via an electronic card reader or a barcode reader of PD 190; and establishing a retail transaction session with an RTS (e.g., RTS 118 of FIG. 1).

The retail transaction session generally involves: communicating the article information and payment information to the RTS via public network connection; receiving a response message from the RTS indicating that the article has been successfully or unsuccessfully purchased; and automatically starting the detachment/deactivation process or prompting the user to start the detachment/deactivation process if the article has been successfully purchased.

The detachment/deactivation process can generally involve: obtaining a unique identifier (e.g., unique identifier 210 of FIG. 2) from the article (e.g., article 102 of FIG. 1) and/or the security tag (e.g., security tag 132 of FIG. 1) via PD 190; forwarding the unique identifier(s) to the RTS; receiving a message from the RTS that includes information specifying a detachment/deactivation key or code associated with the unique identifier; optionally deriving the detachment/deactivation key from the detachment/deactivation code; optionally generating instructions for programming the security tag to unlock an electronic lock mechanism using the detachment key on a one-time basis or deactivation an EAS component thereof using the deactivation key on a one-time basis; commanding PD 190 to forward the detachment key and/or instructions to the security tag via an SRC communication. In some scenarios, the MCD simply forwards the information received from the RTS to the PD 190 without modification. In other scenarios, the MCD modifies the information prior to communication to the PD 190. Such modifications can be performed by a processor with a tamper-proof enclosure such that if a person tries to maliciously obtain access to any algorithm used for such modification purposes, the algorithm(s) will be erased prior to any access thereto. This configuration may be advantageous when cryptography is not employed for communications between the MCD and the RTS. Still, this configuration may be employed even when such cryptography is used.

Figure 4:
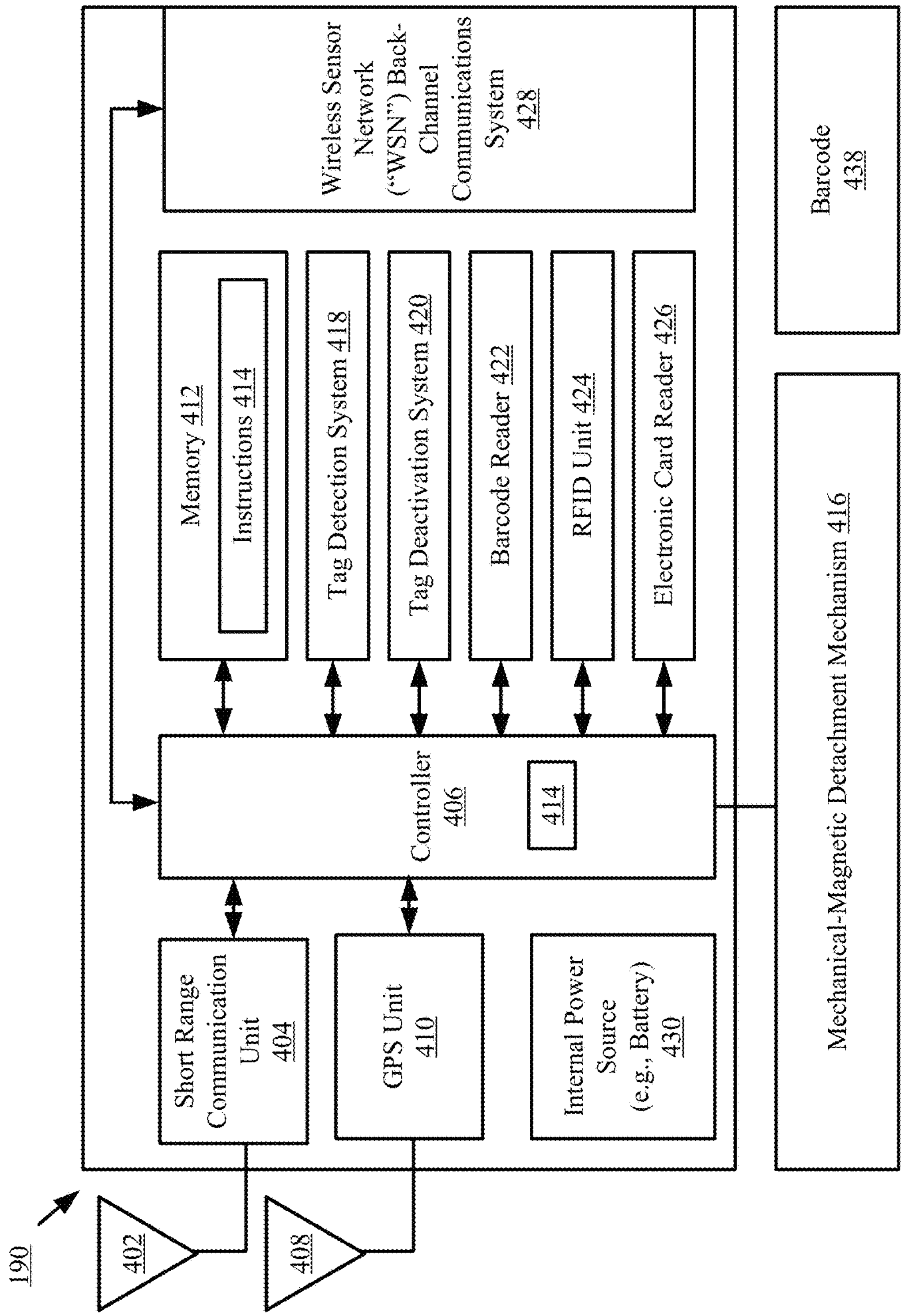
FIG. 4 is a block diagram of an illustrative architecture for a peripheral device shown in FIG. 1.

Referring now to FIG. 4, there is provided a block diagram of an illustrative architecture for the PD 190 of FIG. 1. PD 190 comprises an internal power source 430 for supplying power to certain components 404, 406, 410, 412, 418-428 thereof. Power source 430 can comprise, but is not limited to, a rechargeable battery, a recharging connection port, isolation filters (e.g., inductors and ferrite based components), a voltage regulator circuit, and a power plane (e.g., a circuit board layer dedicated to power). PD 190 may include more or less components than those shown in FIG. 4. For example, PD 190 may further include a UHF radio unit. However, the components shown are sufficient to disclose an illustrative embodiment implementing the present invention. Some or all of the components of the PD 190 can be implemented in hardware, software and/or a combination of hardware and software. The hardware includes, but is not limited to, one or more electronic circuits.

Figure 6:
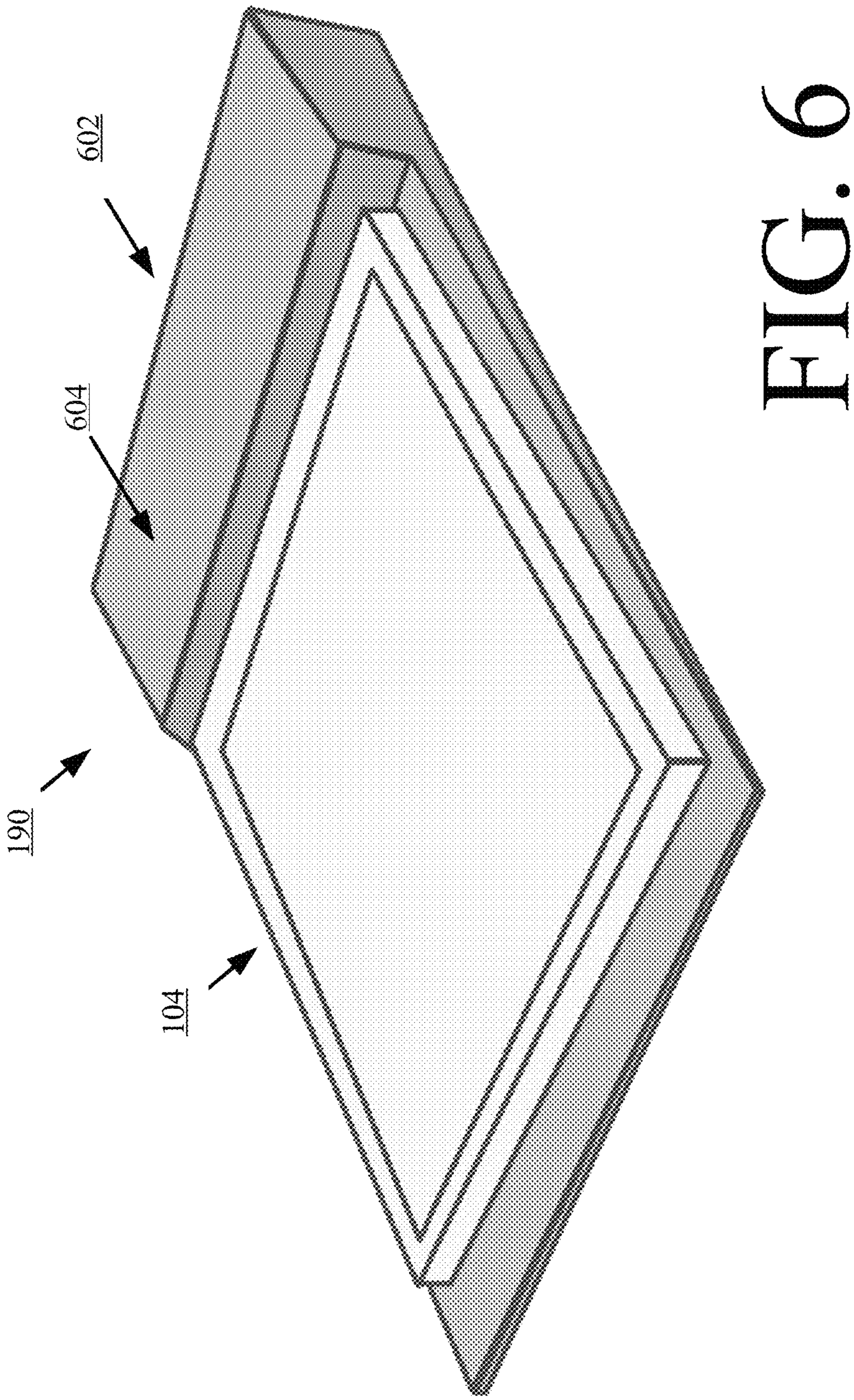
FIG. 6 is a perspective view of a mobile communication device with a peripheral device.
Figure 7:
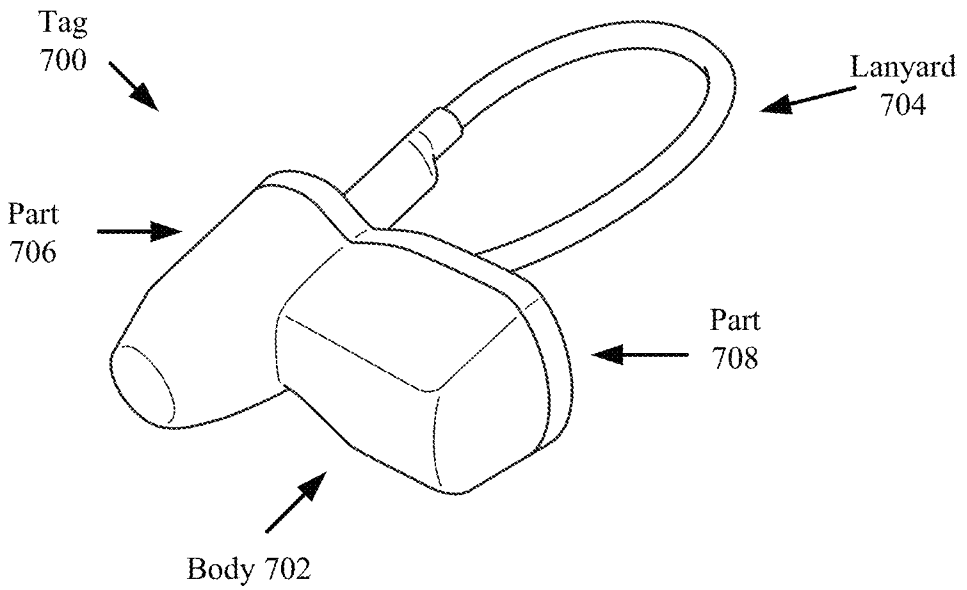
FIG. 7 is a perspective view an illustrative tag having a lanyard in which electronic components are incorporated.
Figure 8:
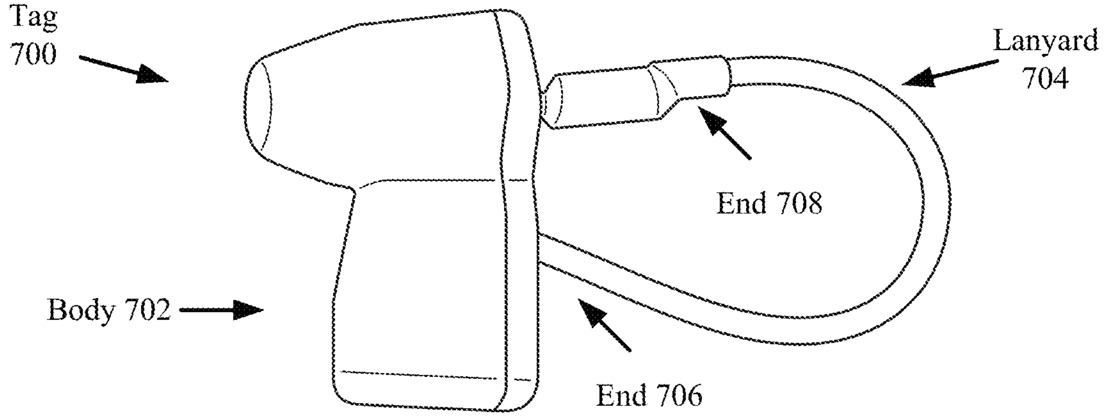
FIG. 8 is a side view of the tag shown in FIG. 7.
Figure 9:
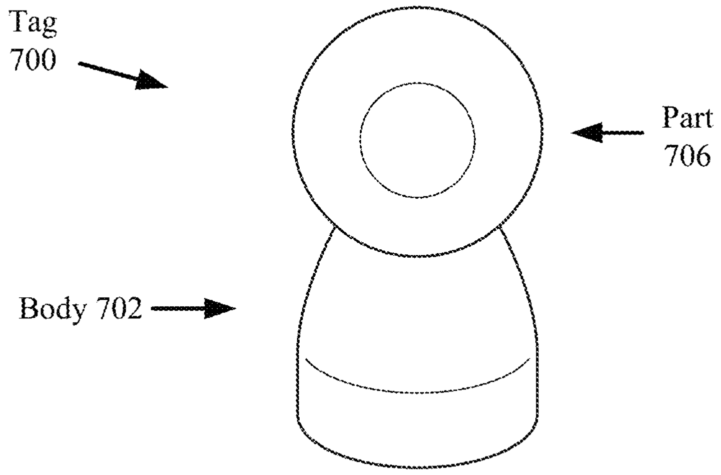
FIG. 9 is a bottom view of the tag shown in FIGS. 7-8.
Figure 10:
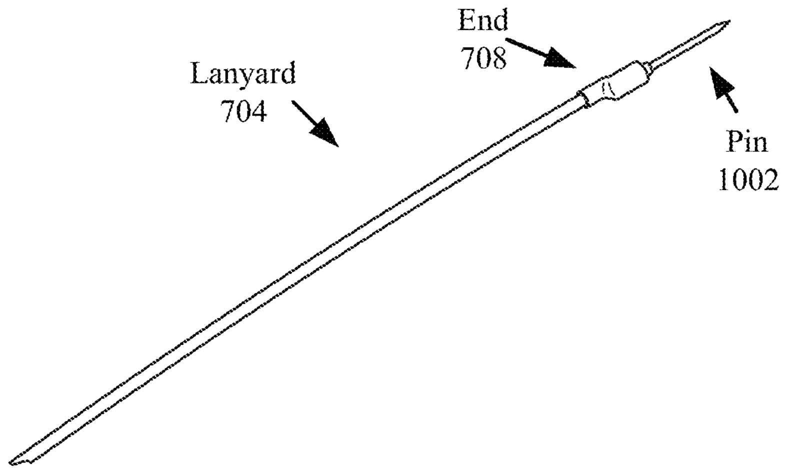
FIG. 10 is an illustration of the lanyard shown in FIGS. 7-8.

Notably, PD 190 is a peripheral device of MCD 104. In some scenarios, PD 190 is designed to wrap around at least a portion of MCD 104. A schematic illustration of such a PD 190 design is provided in FIG. 6. As shown in FIG. 6, the PD 190 comprises a cover or a holder for a tablet computer 104. The present solution is not limited to the exemplary PD architecture shown in FIG. 6. PD 190 may have other architectures for applications in which different types of MCDs are employed (e.g., a Smartphone). In such applications, PD may still be designed to cover at least a portion of MCD such that PD provides a relatively small mobile POS device which is easy to carry by or on a person or vehicle. In all such scenarios, PD 190 is also configured to protect MCD from damage during use thereof.

The PD 190 is also configured to provide at least some of the critical peripheral functions required by a wide variety of mobile retail applications which are not provided by the MCD 104. As such, PD 190 comprises a controller 406 and an SRC unit 404 for coordinating its activities with those of MCD 104. In some scenarios, SRC unit 404 includes, but is not limited to, a Bluetooth transceiver, an RFID transceiver, and/or an NFC transceiver. Notably, the PD 190 acts as a slave device to the master MCD 104. Thus, operations of PD 190 are managed and/or controlled by MCD 104. The manner in which operations of PD 190 are managed and/or controlled by MCD 104 will become more evident as the discussion progresses.

The critical peripheral functions can include, but are not limited to, tag detection functions, tag deactivation/detachment functions, tag read functions, device location determining/tracking/reporting functions, and/or SRC communication functions with security tags, mobile POS equipment, and customer handled devices. In this regard, PD 190 comprises antennas 402, 408, the SRC unit 404, a GPS unit 410, the controller 406, memory 412, a tag detection system 418, a tag deactivation system 420, a barcode reader 422, an RFID unit 424, an electronic card reader 426, and a WSN back-channel communication system 428. PD 190 may also comprise a mechanical-magnetic detachment mechanism 416 and a barcode 438. The listed components 404-412 and 416-428 are housed together in a light weight protective shell (e.g., shell 602 of FIG. 6). The protective shell can be made from a hard rubber or plastic which can protect the listed components 404-412 and 416-428 and the MCD 104 from damage as a result from external factors. The protective shell may also be designed to improve the ergonomics of MCD 104 by making it easier to hold in a user's hands, attach to a vehicle, or wear on a user's body when not in use.

Also, the components can be arranged within the protective shell in any manner that is suitable for a particular application. For example, tag detection and/or deactivation components can be placed within a specific portion (e.g., portion 604 of FIG. 6) the protective shell which is not covered by the MCD coupled to the PD. The antennas may be placed in the protective shell so as to reside below the MCD coupled to the PD.

Each component 404-412 and 416-428 provides one or more capabilities required by various retail applications related to mobile POS operations. For example, during a mobile POS transaction, the SRC unit 404 is used to gain access to a locked display case or other secure area of a retail store in which a retail item(s) is(are) disposed. In some scenarios, heavy equipment may be needed to acquire the retail item(s). Access to such heavy equipment can be obtained using the SRC unit 404. The SRC unit 404 and/or barcode reader 422 are then used to obtain article information needed for a purchase transaction. The article information can be obtained directly from the retail item(s) or from a tag/label disposed adjacent to an edge of a shelf on which the retail item(s) is(are) disposed. Similarly, the electronic card reader 426 is used to obtain payment information from the customer. Upon a successful purchase of the retail item(s), the tag deactivation system 420 is used to deactivate any electro-mechanical lock mechanisms (e.g., lock mechanism 216 of FIG. 2) present on the retail item(s). Also, the RFID unit 424 may be used to deactivate RFID tags present with the retail item(s) (e.g., write to the sold item bit in memory). A mechanical-magnetic detachment mechanism 416 may be used to detach any mechanical-magnetic lock mechanisms (e.g., lock mechanism 222 of FIG. 2) coupled to the retail item(s). Subsequently, retail item information and/or receipt information is communicated to the customer's own mobile device via the SRC unit 404. In some scenarios, the RFID unit 424 may also be used to find RFID-tagged retail item(s) on a shelf or in a display rack (e.g., a garment rack), write receipt data to an RFID tag embedded in a transaction receipt paper or card, and/or conduct inventory cycle count.

The WSN back-channel communications system 428 allows PD to function as a node in a wireless network. In this regard, system 428 may be used as the main data link between PD 190 and an RTS (e.g., RTS 118). System 428 may also be used to physically locate the MCD within the retail store, monitor activities of the MCD, upgrade software of PD and/or MCD, and/or physically lock PD if PD is removed from the retail store without authorization. System 428 may further be used to directly transfer transaction and event data to other devices in the retail store (e.g., smart EAS pedestals or EAS pedestals synchronization systems) which may be untethered to the retail store's main network (e.g., intranet 110 of FIG. 1).

In some scenarios, system 428 comprises a WSN transceiver, an antenna, and matching circuitry appropriate for frequency bands being used in WSN communication. System 428 may also comprise a controller, separate from controller 406, for facilitating the control of the operations of the WSN transceiver of system 428. This separate controller may act as a slave to controller 406. System 428 may further comprise power management circuitry which draws power from an internal power source separate from internal power source 430.

Using system 428, PD 190 can communicate its status and activity over the wireless sensor network, receive software updates, and perform management tasks (e.g., location tasks). By using the SRC unit 404 and system 428, the MCD/PD has a way to communicate with other applications running on remote servers or network nodes of a public network (e.g., public network 106 of FIG. 1), assuming system 428 is connected directly or via routers to those remote servers or network nodes. Also, SRC communications and/or WSN communications may be used by the MCD/PD for accessing resources of an RTS system (e.g., RTS system 118 of FIG. 1) or public network if alternative communication channels fail or are too busy. In some scenarios, system 428 may employ any number of standard communications channels, frequencies and/or protocols. For example, system 428 employs ISM bands (e.g., 433 MHz, 902-928 MHz, and 2.4 GHzs). Thus, an important advantage of including system 428 as part of PD 190 is to improve the overall connectivity robustness and network connection options of the MCD.

As evident from the above discussion, PD 190 comprises at least four separate systems 404, 420, 424, 428 for wireless data collection and security tag interaction. In some scenarios, these systems 404, 420, 424, 428 use different communication bands, frequencies, and/or protocols. For example, tag detection system 420 is configured to deactivate AcoustoMagnetic ("AM") security tags with a pulse of high energy at around 58 KHz. SRC unit 404 may comprise an NFC transceiver operating at around 13.56 MHz. RFID unit 312 and WSN back-channel communication system 428 operate in the Ultra High Frequency ("UHF") Industrial, Scientific and Medical ("ISM") bands (i.e., 850-950 MHz). The components 424, 428 may be combined into a single unit using a UHF radio employing two different software functions to implement the two RFID and WSN protocols.

As noted above, PD 190 comprises an RFID unit 424. In some scenarios, RFID unit 424 comprises an active-RFID or Real-Time Location System ("RTLS") tag which is used in conjunction with external readers and/or transceivers to locate the PD 190 and determine its status. The active-RFID or RTLS tag is integrated into the PD 190 and communicates with controller 406. The active-RFID or RTLS tag also allows PD 190 to communicate its status and/or activity over a network to which a reader or transceiver is attached. The RFID unit 424 also comprises hardware and/or software configured to receive software updates, perform management tasks (e.g., location determining and/or reporting tasks), read RFID tags, and/or write to RFID tags.

The operations of RFID unit 424 can be controlled by the MCD to which PD 190 is attached. In this regard, the MCD comprises software (e.g., software 358 of FIG. 3) configured to serve as an interface to RFID unit 424. The RFID functions of the MCD/PD combination can be used in a variety of applications. For example, the RFID functions may be used in stock-keeping process in which a number of RFID-tagged retail items present within a retail store are counted. In this case, the MCD communicates command to the PD via SRCs (e.g., Bluetooth communications) for initiating such RFID stock-keeping activities.

Clearly, components 406, 424, 428 together form a link set which can be used to make RFID tags visible to external applications running in the WSN or devices in any network connection to the WSN. This activity may be managed and/or triggered by a software application running on controller 406 of PD 190 or by a software application running on the MCD via an SRC connection (e.g., a Bluetooth connection).

In some scenarios, retail NFC tags may be placed on retail items or in the retail environment (e.g., on the edges of retail shelves or on placards in prominent locations inside a retail store). The SRC unit 404 may be used to obtain information from these retail NFC tags via NFC communications. Such information can include, but is not limited to, instructions for use, promotional information, product warning information, product ingredient information, product price information, and/or product availability information. An NFC communication occurs between the SRC unit 404 and the retail NFC tag over a relatively small distance (e.g., N centimeters or N inches, where N is an integer such as twelve). The NFC communication may be established by touching the SRC unit 404 and retail NFC tag 190 together or bringing them in close proximity such that an inductive coupling occurs between inductive circuits thereof. The information obtained via these NFC communications may then be forwarded from the SRC unit 404 to controller 406. In turn, the controller 406 forwards the information to the MCD via an SRC (e.g., a Bluetooth communication). At the MCD, the information is processed to determine what action is to be taken. In the case of a look-up, a certain type of information for the retail item in question may be retrieved from an RTS (e.g., RTS 118 of FIG. 1). The retrieved information may then be displayed to a user of the MCD/PD.

NFC communications may also be used to transfer itemized or aggregated sales data, employee activity data, or other operations data from an MCD to which the PD 190 is coupled to another MCD of the retail store. Such a data transfer may be facilitated by the respective WSN back-channel communications systems 428 and/or the SRC units 404 of the PDs of the two MCDs. Prior to this WSN data transfer, identification and/or authentication operations may be performed as an MCD-to-MCD data transfer security protocol.

One or more sets of instructions 414 are stored in memory 412. The instructions 414 may include customizable instructions and non-customizable instructions. The instructions 414 can also reside, completely or at least partially, within the controller 406 during execution thereof by PD 190. In this regard, the memory 412 and the controller 406 can constitute machine-readable media. The term "machine-readable media", as used here, refers to a single medium or multiple media that stores one or more sets of instructions 414. The term "machine-readable media", as used here, also refers to any medium that is capable of storing, encoding or carrying the set of instructions 414 for execution by the PD 190 and that causes the PD 190 to perform one or more of the methodologies of the present disclosure.

Notably, in some scenarios, the GPS unit 410 can be used to facilitate the enablement and disablement of one or more operations of the PD 190 and/or MCD 104. For example, the location of the PD 190 and/or MCD 104 can be determined using the GPS unit 410. Information specifying the location of the PD 190 and/or MCD 104 can be sent to the EAS system 130 and/or RTS 118 for processing thereat. Based on the location information, the system 118, 130 can generate and communicate a command to the PD 190 and/or MCD 104 to enable or disable operations thereof. Such a configuration may be employed to ensure that a user of the PD 190 and/or MCD 104 is able to access and use certain functions thereof only within a specified area of a retail store. Also, such a configuration can prevent theft of the PD 190 and/or MCD 104 since one or more operations thereof can be disabled when the equipment leaves the premises of the retail store.

Figure 5:
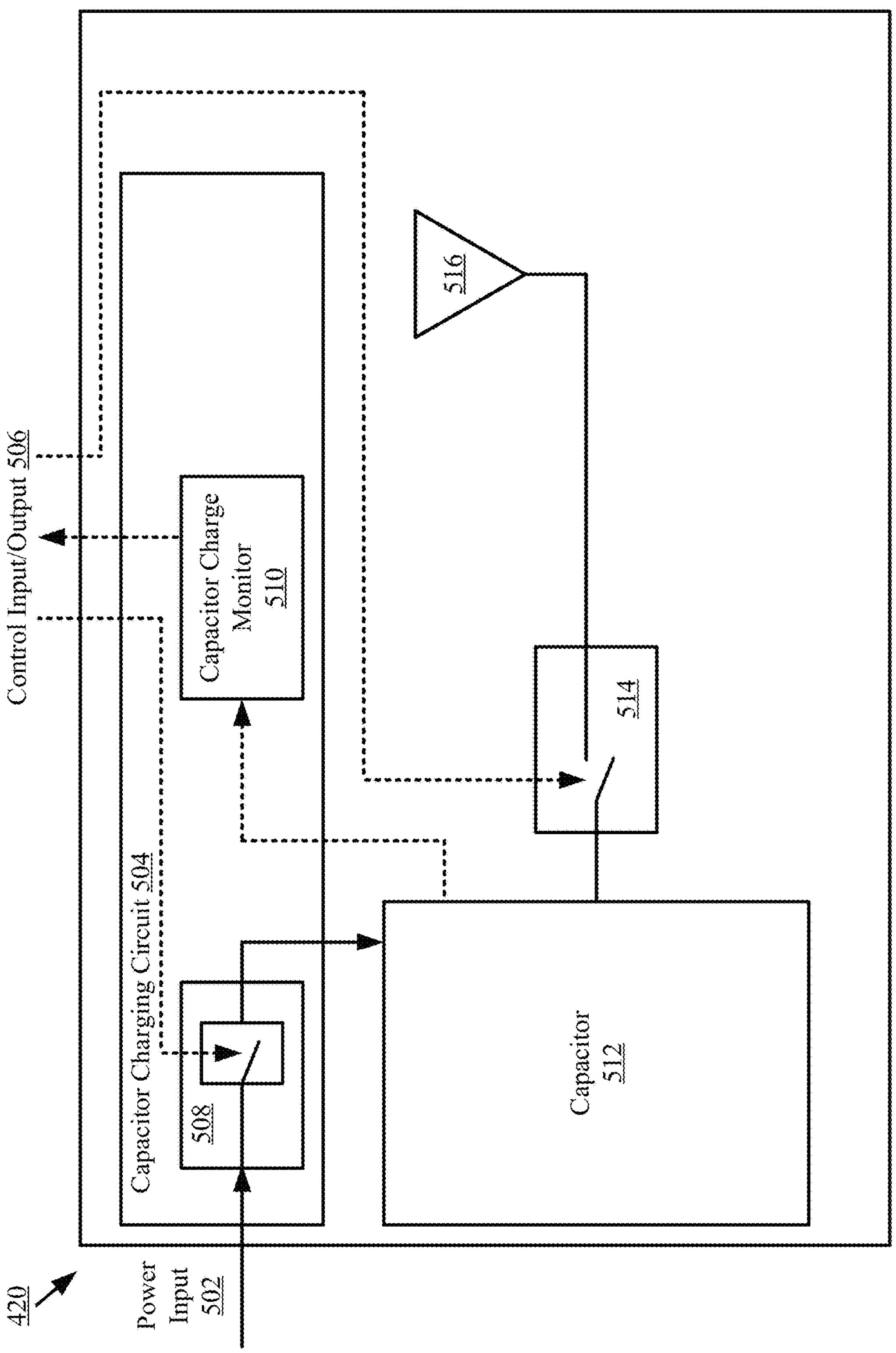
FIG. 5 is a block diagram of an illustrative architecture for a tag deactivation system shown in FIG. 4.

Referring now to FIG. 5, there is provided a block diagram of an exemplary architecture for a tag deactivation system 420 shown in FIG. 4. System 420 comprises a capacitor charging circuit 504, a capacitor 512, a discharging switch 514 and a deactivation antenna 516. The capacitor charging circuit 504 includes a charging switch 508 and a capacitor charge monitor 510. During operation, a control signal is received by system 420 from controller 406 of FIG. 4. The control signal includes information for closing charging switch 508. When charging switch 508 is closed, power is supplied from power input 502 to charge capacitor 512.

The charge on capacitor 512 is monitored by capacitor charge monitor 510. Monitor 510 communicates capacitor charge information to the controller 406 of FIG. 4 such that controller 406 can additionally or alternatively monitor the charge on capacitor 512. Based on the capacitor charge information, a determination is made as to whether the charging switch 508 should be opened or closed (i.e., to charge or not charge the capacitor 512). A determination is also made as to whether a discharging switch 514 should be opened or closed (i.e., to discharge or not discharge capacitor 512). If it is determined that capacitor 512 should be discharged, then discharging switch 514 is closed such that capacitor 512 discharges through antenna 516. As a result of the capacitor discharge, energy is pulsed at a desired frequency from the antenna 516.

Operations of the above described system 100 are described in detail in FIGS. 7-10 of U.S. Pat. No. 9,098,900. FIGS. 7-10 are not reproduced herein simply for each of discussion. The entire contents of this patent are incorporated herein by reference. The elongated flexible security tags can be used in system 100, and detached/deactivated in the manner described therein.

Illustrative Tag Structures

Most prior solutions have looked at ways of reducing the tag itself to reduce its footprint required to secure an article rather than investigating ways to take advantage of the currently existing architectures specifically related to lanyards. By incorporating an e-thread type device within the lanyard, the sizeable tag aspect of an RFID sensor can be eliminated (i.e., traditional inlay). This same type of e-thread device could be incorporated in disposable price tag attachment components (e.g., lanyard, rope, string or zip tie). EAS components could also be incorporated into the flexible elongate structure (i.e., lanyard, rope, string or zip tie) along with the e-thread device.

By adding the e-thread device to the tags or other labeling element, a company is not burdened with (for example) finding a way to stich the RFID thread into a garment. Also, a lanyard or plastic price tag string allows for easy attachment to essentially any device.

Referring now to FIGS. 7-10, there are provided illustrations of an illustrative tag 700 implementing the present solution. The tag 700 comprises a body 702 and a lanyard 704. The tag body 702 is not limited to the size and shape shown in FIGS. 7-10. The body 702 could alternatively be designed to only comprise part 706 and not part 708.

Figure 11:
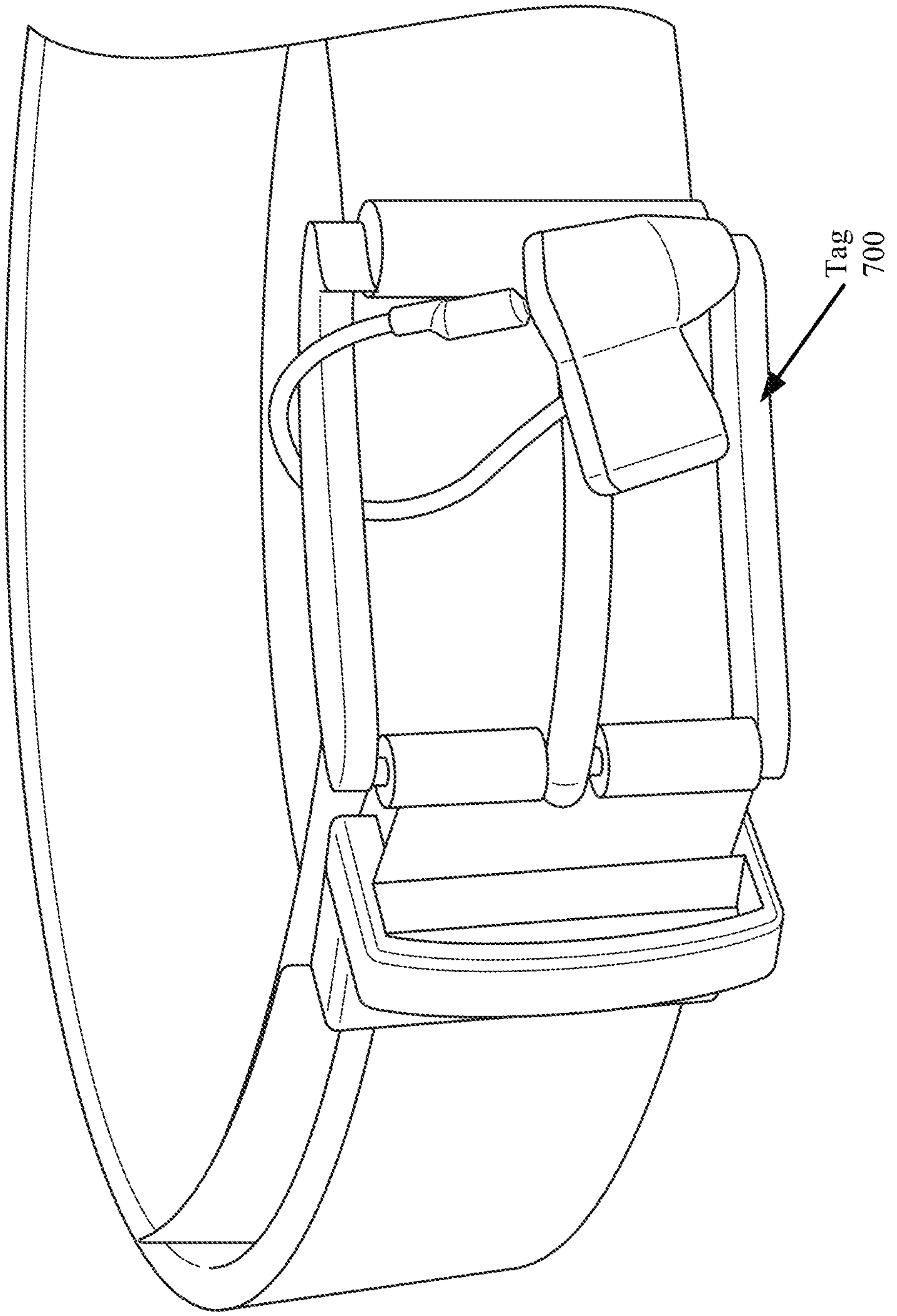
FIG. 11 shows the tag of FIGS. 7-10 coupled to an article (e.g., a belt).

A first end 706 of the lanyard 704 is securely coupled to the tag's body 702. A second end 708 of the lanyard 704 is releasable secured to the tag's body in FIGS. 7-8. A pin 1002 is coupled to the second end 708 of the lanyard 704. A securement mechanism is disposed in a part 706 of the tag's body for securing the pin 1002 therein. Securement mechanisms are well known in the art, and therefore will not be described in detail herein. Any known or to be known securement mechanism can be used herein without limitation. For example, the securement mechanism includes, but is not limited to, a ball clutch disclosed in U.S. Pat. No. 7,190,272 or a magnetic clutch disclosed in U.S. Pat. No. 8,847,762. An internal magnet can be provided in the tag's body that can be mechanically moved in and out of proximity to the securement mechanism for facilitating attachment and detachment of the tag to an article. The lanyard, pin and securement mechanism facilitate the tag's coupling to an article, as shown in FIG. 11. Additionally, a non-magnetic latch mechanism can be incorporated to release the lanyard. One such non-magnetic latch mechanism is contained SuperTag Tags available from Tyco Retail Solutions of Boca Raton, Florida.

Electronic components are incorporated into the lanyard 704. In effect, the size of the tag is relatively small as compared to conventional tags. The electronic components include, but are not limited to, a communications enabled device (e.g., device 136 of FIGS. 1-2), an EAS component (e.g., EAS component 138 of FIGS. 1-2), and/or an optional battery (e.g., battery 220 of FIG. 2). The communications enabled device is provided in the form of an e-thread device having an antenna (e.g., antenna 202 of FIG. 2) coupled to an Integrated Circuit ("IC"). The IC is configured to operate as a communications device. In this regard, the IC comprises a communications component (e.g., communications component 204 of FIG. 2) coupled to the antenna, a controller (e.g., controller 206 of FIG. 2) and a memory (e.g., memory 208 of FIG. 2). The communications enabled device can include other electronic components selected in accordance with a particular application. The other electronic components can include a power management circuit. Power management circuits are well known in the art, and therefore will not be described herein. Any known or to be known power management circuit can be used herein. For example, the power management circuit comprises the power management circuit described in International Application No. PCT/US2017/028373.

EAS components are well known in the art, and therefore will not be described herein. Any known or to be known EAS component can be used herein without limitation. For example, the EAS component includes a resonator, a bias element and an optional spacer therebetween. Illustrative EAS components having this arrangement are described in U.S. patent application Ser. Nos. 15/600,997 and 15/812,929. Alternatively, the EAS component includes a coil wrapped around a core (e.g., a ferrite core or air core). Illustrative EAS components having this arrangement are described in U.S. Pat. No. 9,711,019.

In some scenarios, the lanyard is formed of a non-metallic rope material to create an air core onto which an EAS resonator and necessary electronic elements can be wound (e.g., 58 kHz or 8.2 MHz). Examine non-metallic rope materials include, but are not limited to, ePTFE, Kevlar, or carbon fiber. Similarly, a rubberized ferrite core or ferrite beads could be used in some form in a section or all of the lanyard rope to improve EAS element performance. In another scenarios, the rope lanyard could be maintained in metallic form and designed such that it acts itself as the antenna element. These types of solutions are particularly beneficial (for example) for securing and tracking small items as they represent the smallest implementation of an EAS solution that still incorporates a magnetic or electromagnetic detachment system.

Figure 12:
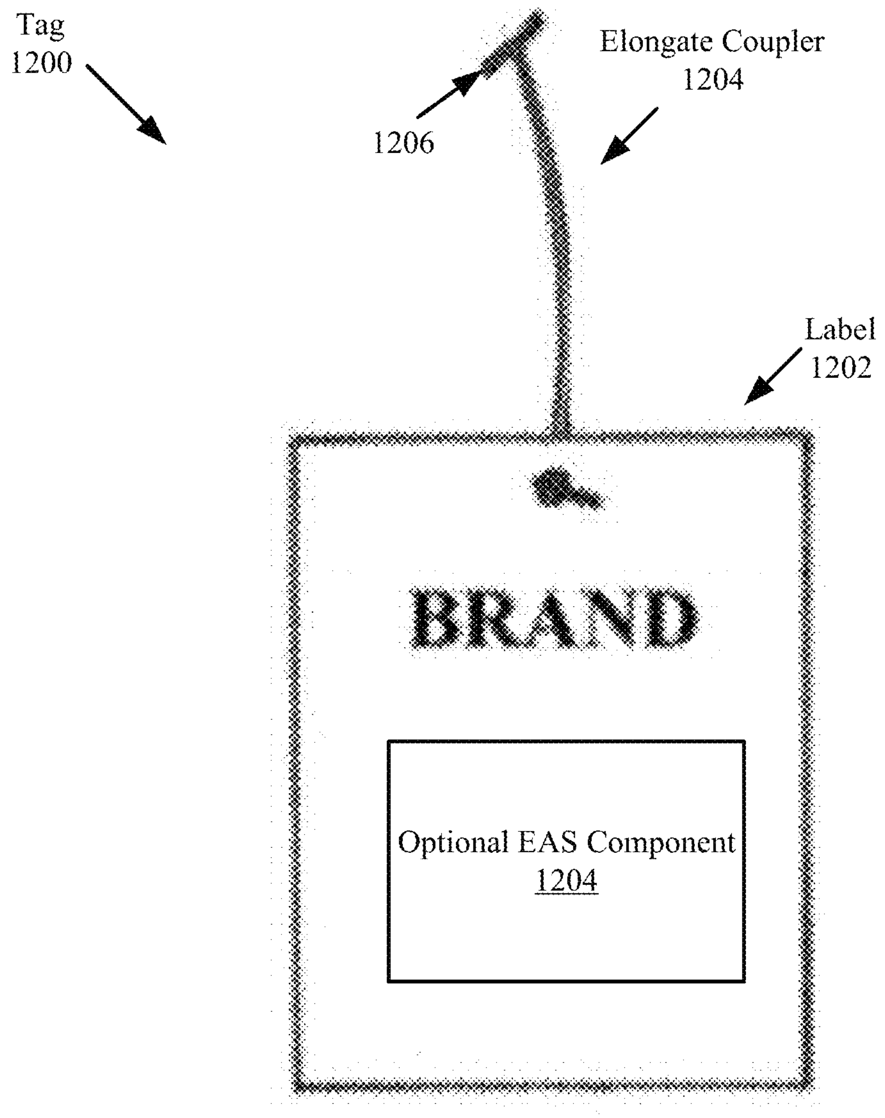
FIG. 12 is an illustration of a swing tag having a string in which electronic components are incorporated.

Referring now to FIG. 12, there is provided an illustration of an illustrative tag 1200. Tag 1200 is generally in the form of a swing tag to be coupled to an article (e.g., a piece of clothing). In this regard, tag 1200 comprises a label 1202 and an elongate coupler 1204 for coupling the label to an article. The label 1202 can be made from any rigid or semi-rigid material, such as plastic, cardboard or paper. Item information may be printed on the label. An EAS component (e.g., EAS component 138 of FIGS. 1-2) may be coupled to the label 1202 (e.g., via an adhesive). Additionally, the swing tag itself could include the printed battery and/or other necessary electronics for the EAS element or other radio communication antenna located in the elongate coupler.

The elongate coupler 1204 is flexible and has at least one electronic component incorporated therein. The electronic components include, but are not limited to, a communications enabled device (e.g., device 136 of FIGS. 1-2), an EAS component (e.g., EAS component 138 of FIGS. 1-2), and/or an optional battery (e.g., battery 220 of FIG. 2). The communications enabled device is provided in the form of an e-thread device having an antenna (e.g., antenna 202 of FIG. 2) coupled to an Integrated Circuit ("IC"). The IC is configured to operate as a communications device. In this regard, the IC comprises a communications component (e.g., communications component 204 of FIG. 2) coupled to the antenna, a controller (e.g., controller 206 of FIG. 2) and a memory (e.g., memory 208 of FIG. 2). The communications enabled device can include other electronic components selected in accordance with a particular application. The other electronic components can include a power management circuit.

The elongate coupler 1204 includes a portion formed of an optional heat sensitive material 1206 (e.g., plastic or wax). The heat sensitive material melts when heat is applied thereto. In this regard, the tag 1200 is configured to be detached from an article by: receiving a wireless signal including a detach command; authenticating the detach command; and causing heat to be applied to the heat sensitive material in response to an authentication of the detach command. Application of the heat causes the heat sensitive material to melt or become weakened such that the tag 1200 can be pulled apart from an article. The elongate coupler could also comprise unique mechanical detachment features such as a physical lock that requires a unique key or magnetic release that is controlled by a business entity residing in section 1206.

Figure 13:
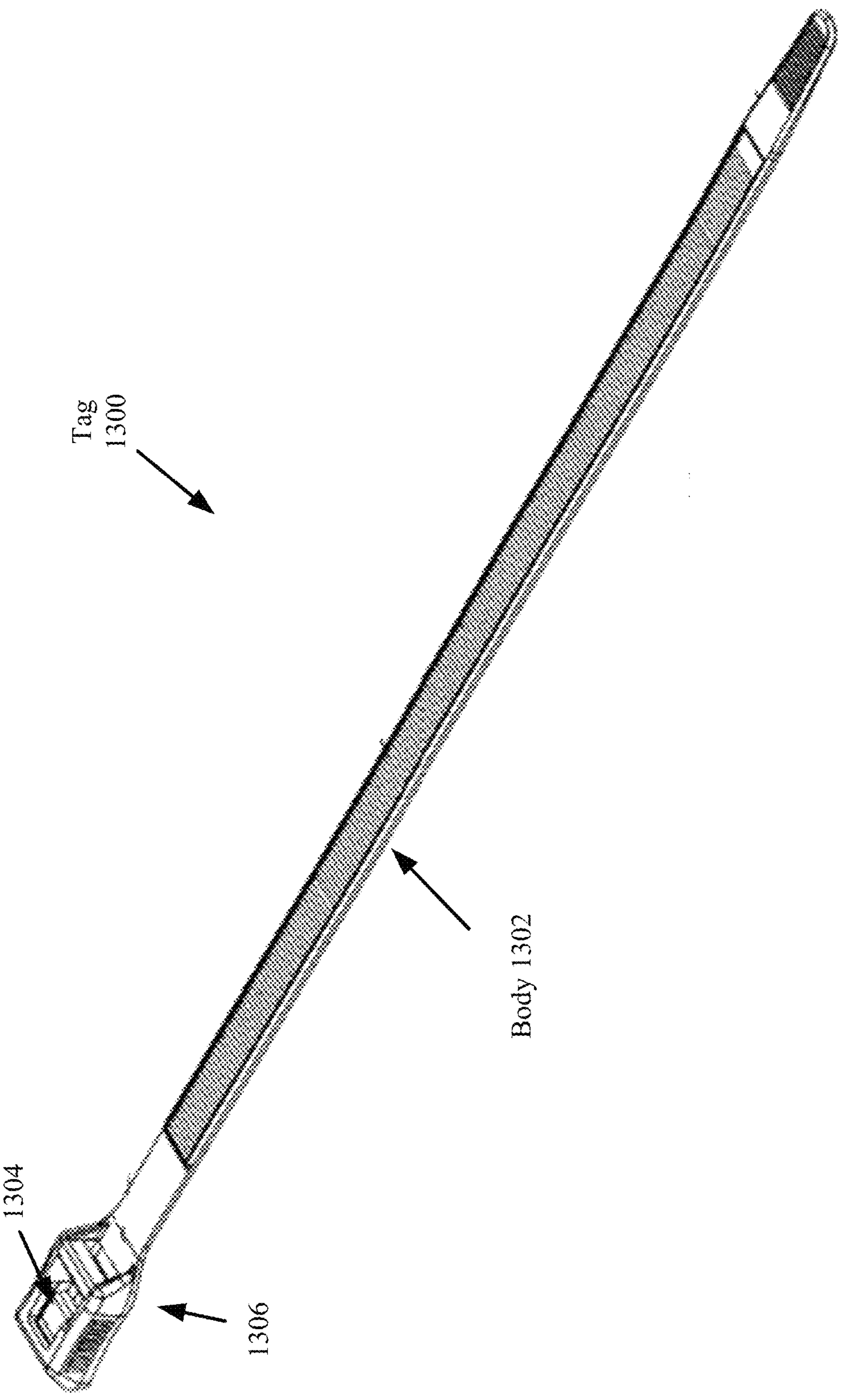
FIG. 13 is an illustration of a zip tie having an elongate body in which electronic components are incorporated.

Referring now to FIG. 13, there is provided an illustration of an illustrative tag 1300. Tag 1300 is generally in the form of a zip tie to be coupled to an article (e.g., a piece of clothing). In this regard, tag 1300 comprises an elongate body 1302 with protrusions formed thereon. The elongate body 1302 is sized and shaped to be threaded through an aperture 1304 formed in an end 1306 thereof. The aperture is designed with a means to engage the protrusions so as to secure the elongate body in its threaded position.

Notably, the elongate body 1302 has at least one electronic component incorporated therein. The electronic components include, but are not limited to, a communications enabled device (e.g., device 136 of FIGS. 1-2) and/or an optional battery (e.g., battery 220 of FIG. 2). The communications enabled device is provided in the form of an e-thread device having an antenna (e.g., antenna 202 of FIG. 2) coupled to an Integrated Circuit ("IC"). The IC is configured to operate as a communications device. In this regard, the IC comprises a communications component (e.g., communications component 204 of FIG. 2) coupled to the antenna, a controller (e.g., controller 206 of FIG. 2) and a memory (e.g., memory 208 of FIG. 2). The communications enabled device can include other electronic components selected in accordance with a particular application. The other electronic components can include a power management circuit.

An EAS component (e.g., EAS component 138 of FIGS. 1-2) may also be incorporated into the elongate body 1302. EAS components are well known in the art, and therefore will not be described herein. Any known or to be known EAS component can be used herein without limitation. For example, the EAS component includes a resonator, a bias element and an optional spacer therebetween. Illustrative EAS components having this arrangement are described in U.S. patent application Ser. Nos. 15/600,997 and 15/812,929. Alternatively, the EAS component includes a coil wrapped around a core (e.g., a ferrite core or air core). Illustrative EAS components having this arrangement are described in U.S. Pat. No. 9,711,019.

The arrangements of the electronic components, EAS components, and/or batteries in the lanyard 704, swing tag's elongate coupler 1204, and zip tie's elongate body 1302 can be the same as, similar to, or different from each other. Some of these arrangements are shown in FIGS. 14-17 as illustrative elongate flexible tag architectures. The present solution is not limited to that shown in FIGS. 14-17. Other arrangements are possible as would be readily understood by a person skilled in the art.

Figure 14:
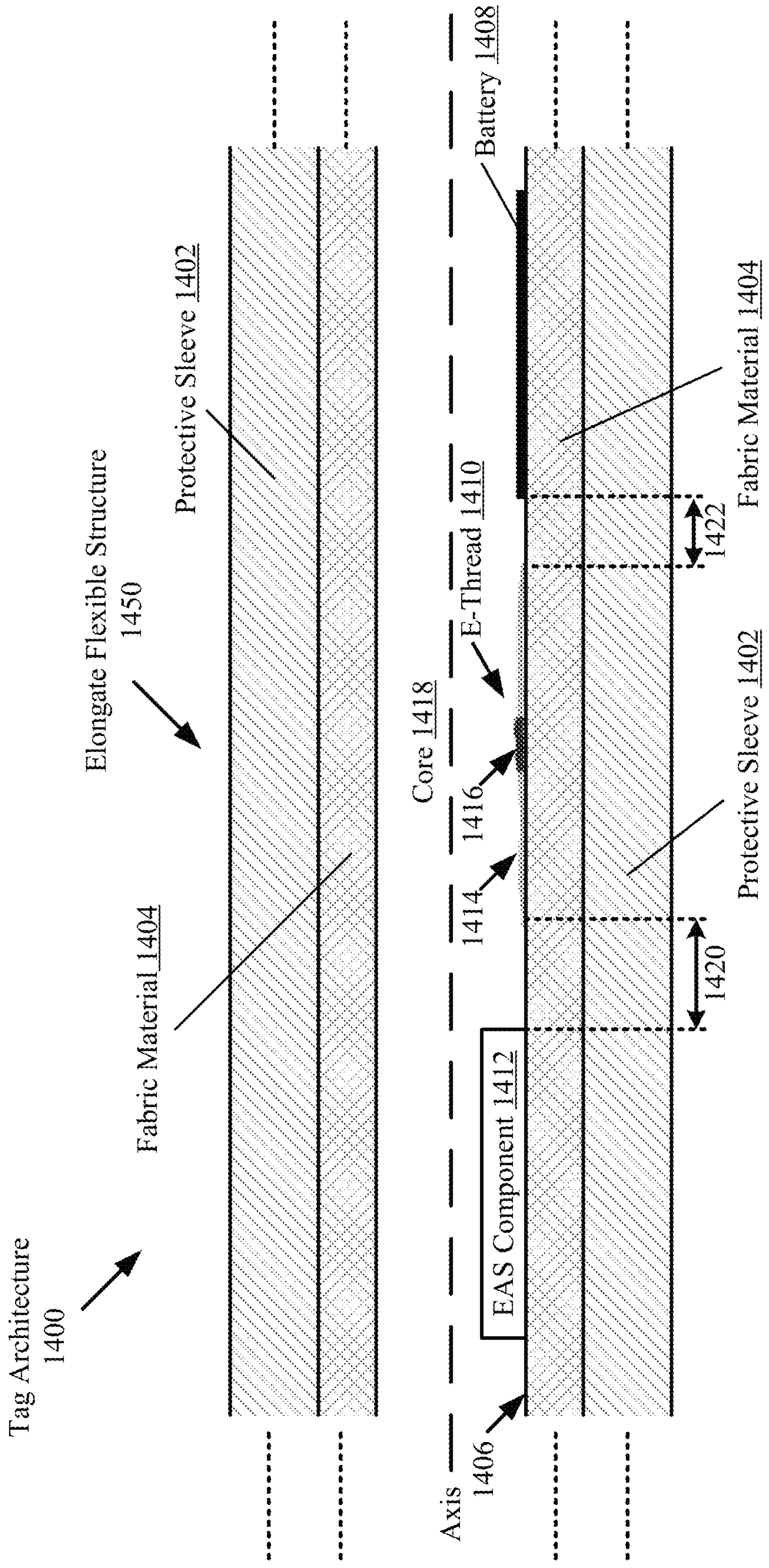
FIGS. 14-17 each provide an illustration showing an illustrative architecture of an elongate flexible tag.

Referring now to FIG. 14, there is provided a cross-sectional view of an illustrative elongate flexible tag architecture 1400. The architecture 1400 comprises an elongate flexible structure 1450. The elongate flexible structure 1450 includes, but is not limited to, a lanyard, a rope, a string or a zip tie. The elongate flexible structure 1450 has a plurality of layers. The layers include a core 1418, a fabric material 1404, and a protective sleeve 1402. The present solution is not limited to the number of layers shown in FIG. 14. The elongate flexible structure 1450 can include more or less layers selected in accordance with a particular application. These additional layers can reside between layers 1402, 1404 or above layer 1402.

The core 1418 is a fluid (e.g., air) or solid (e.g., ePTFE) filled space inside the fabric material 1404. The fabric material 1404 is protected from damage by the protective sleeve 1402. The protective sleeve 1402 is formed of a high strength material, such as ePTFE, Kevlar or a rubber.

An e-thread 1410, battery 1408 and EAS component 1412 are disposed on some layer inside the elongate flexible structure. The e-thread 1410 is coupled to an inner surface 1406 of the fabric material 1404 via any mechanical attachment method including an adhesive (e.g., glue), over-molding/co-molding, or heat bonding. The e-thread 1410 comprises one or more antenna elements 1414 coupled to an IC 1416. The IC 1416 is configured to operate as a communications device. The communications device includes, but is not limited to, an RFID enabled device, SRC enabled device or an NFC enabled device.

The communications device can be passive or active. In the passive scenarios, the IC 1416 derives power from received RF, SRC or NFC energy. As such, the battery 1408 is not needed in this scenario. In contrast, in the active scenarios, the battery 1408 is provided to power the IC 1416. The battery 1408 includes, but is not limited to, a flexible battery printed directly on the fabric material 1404. A trace (not shown in FIG. 14) electrically connects the battery 1408 to the IC 1416. The battery 1408 is spaced apart from the e-thread 1410 by a distance 1422. The distance 1422 can be any distance selected in accordance with a particular application.

The EAS component 1412 is also coupled to the inner surface 1406 of the fabric material 1404 via any mechanical attachment method including an adhesive (e.g., glue), over-molding/co-molding, or heat bonding. The EAS component 1412 includes, but is not limited to, a resonator/bias element type EAS component, or an RFID chip (passive or active). The EAS component 1412 is spaced apart from the e-thread 1410 by a distance 1420. The distance 1420 can be any distance selected in accordance with a particular application.

Figure 15:
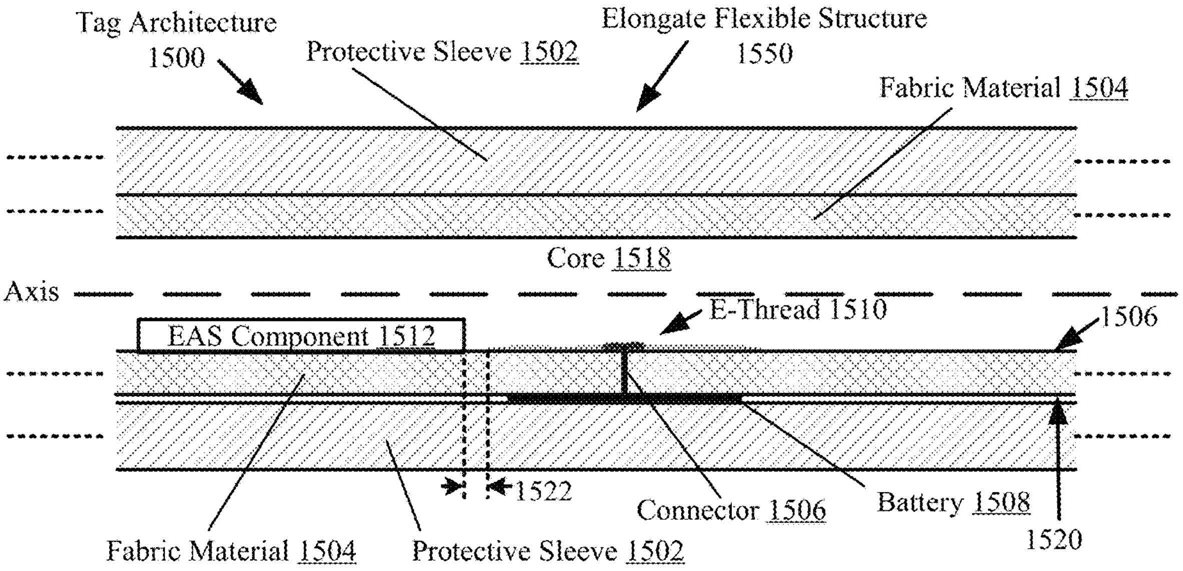

Referring now to FIG. 15, there is provided a cross-sectional view of an illustrative elongate flexible tag architecture 1500. The architecture 1500 comprises an elongate flexible structure 1550. The elongate flexible structure 1550 includes, but is not limited to, a lanyard, a rope, a string or a zip tie. The elongate flexible structure 1550 has a plurality of layers. The layers include a core 1518, a fabric material 1504, and a protective sleeve 1502. The present solution is not limited to the number of layers shown in FIG. 15. The elongate flexible structure 1550 can include additional layers selected in accordance with a particular application. These additional layers can reside between layers 1502, 1504 or above layer 1502.

The core 1518 is a fluid (e.g., air) or solid (e.g., ePTFE) filled space inside the fabric material 1504. The fabric material 1504 is protected from damage by the protective sleeve 1502. The protective sleeve 1502 can be formed of a high strength material, such as ePTFE, Kevlar or a rubber.

An e-thread 1510, battery 1508 and EAS component 1512 are integrated with the elongate flexible structure 1550. The e-thread 1510 is coupled to an inner surface 1506 of the fabric material 1504 via any mechanical attachment method including an adhesive (e.g., glue), over-molding/co-molding, or heat bonding. The e-thread 1510 comprises one or more antenna elements coupled to an IC. The IC is configured to operate as a communications device. The communications device includes, but is not limited to, an RFID enabled device, SRC enabled device or an NFC enabled device.

The communications device can be passive or active. In the passive scenarios, the IC derives power from received RF, SRC or NFC energy. As such, the battery 1508 is not needed in this scenario. In contrast, in the active scenarios, the battery 1508 is provided to power the IC. The battery 1508 includes, but is not limited to, a flexible battery printed directly on an outer surface 1520 of the fabric material 1504. A connector 1506 is provided to electrically connect the battery 1508 to the e-thread 1510. In this regard, the connector 1506 extends through the fabric material 1504 from the battery 1508 to the IC of the e-thread 1510. The connector 1506 includes, but is not limited to, a conductive wire.

The EAS component 1512 is also coupled to the inner surface 1506 of the fabric material 1504 via any mechanical attachment method including an adhesive (e.g., glue), over-molding/co-molding, or heat bonding. The EAS component 1512 includes, but is not limited to, a resonator/bias element type EAS component. The EAS component 1512 is spaced apart from the e-thread 1510 by a distance 1522. The distance 1522 can be any distance selected in accordance with a particular application.

Figure 16:
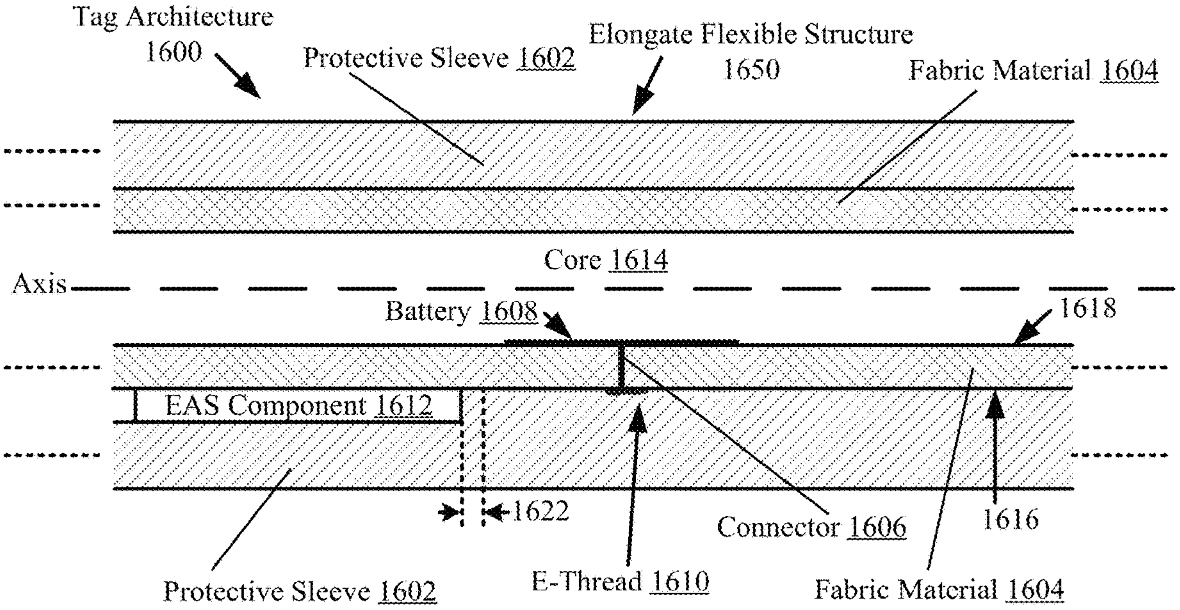

Referring now to FIG. 16, there is provided a cross-sectional view of an illustrative elongate flexible tag architecture 1600. The architecture 1600 comprises an elongate flexible structure 1650. The elongate flexible structure 1650 includes, but is not limited to, a lanyard, a rope, a string or a zip tie. The elongate flexible structure 1650 has a plurality of layers. The layers include a core 1614, a fabric material 1604, and a protective sleeve 1602. The present solution is not limited to the number of layers shown in FIG. 16. The elongate flexible structure 1650 can include additional layers selected in accordance with a particular application. These additional layers can reside between layers 1602, 1604 or above layer 1602.

The core 1618 is a fluid (e.g., air) or solid (e.g., ePTFE) filled space inside the fabric material 1604. The fabric material 1604 is protected from damage by the protective sleeve 1602. The protective sleeve 1602 is formed of a high strength material or rubber.

An e-thread 1610, battery 1608 and EAS component 1612 are integrated with the elongate flexible structure 1650. The e-thread 1610 is compressed between an outer surface 1616 of the fabric material 1604 and the protective sleeve 1602. In this regard, the protective sleeve 1602 comprises a heat shrink material. The e-thread 1610 may also be wrapped around or molded onto the fabric material 1604 prior to being covered by the protective sleeve 1602. In the molded scenario, a low temperature over molding process can be used. Such molding processes are well known in the art, and will not be described herein. The e-thread 1510 comprises one or more antenna elements coupled to an IC. The IC is configured to operate as a communications device. The communications device includes, but is not limited to, an RFID enabled device, SRC enabled device or an NFC enabled device.

The communications device can be passive or active. In the passive scenarios, the IC derives power from received RF, SRC or NFC energy. As such, the battery 1608 is not needed in this scenario. In contrast, in the active scenarios, the battery 1608 is provided to power the IC. The battery 1608 includes, but is not limited to, a flexible battery printed directly on an inner surface 1618 of the fabric material 1604. A connector 1606 is provided to electrically connect the battery 1608 to the e-thread 1610. In this regard, the connector 1606 extends through the fabric material 1604 from the battery 1608 to the IC of the e-thread 1610. The connector 1606 includes, but is not limited to, a conductive wire.

The EAS component 1612 is also compressed between the outer surface 1616 of the fabric material 1604 and the protective sleeve 1602. The EAS component 1612 includes, but is not limited to, a resonator/bias element type EAS component. The EAS component 1612 is spaced apart from the e-thread 1610 by a distance 1622. The distance 1622 can be any distance selected in accordance with a particular application.

Figure 17:
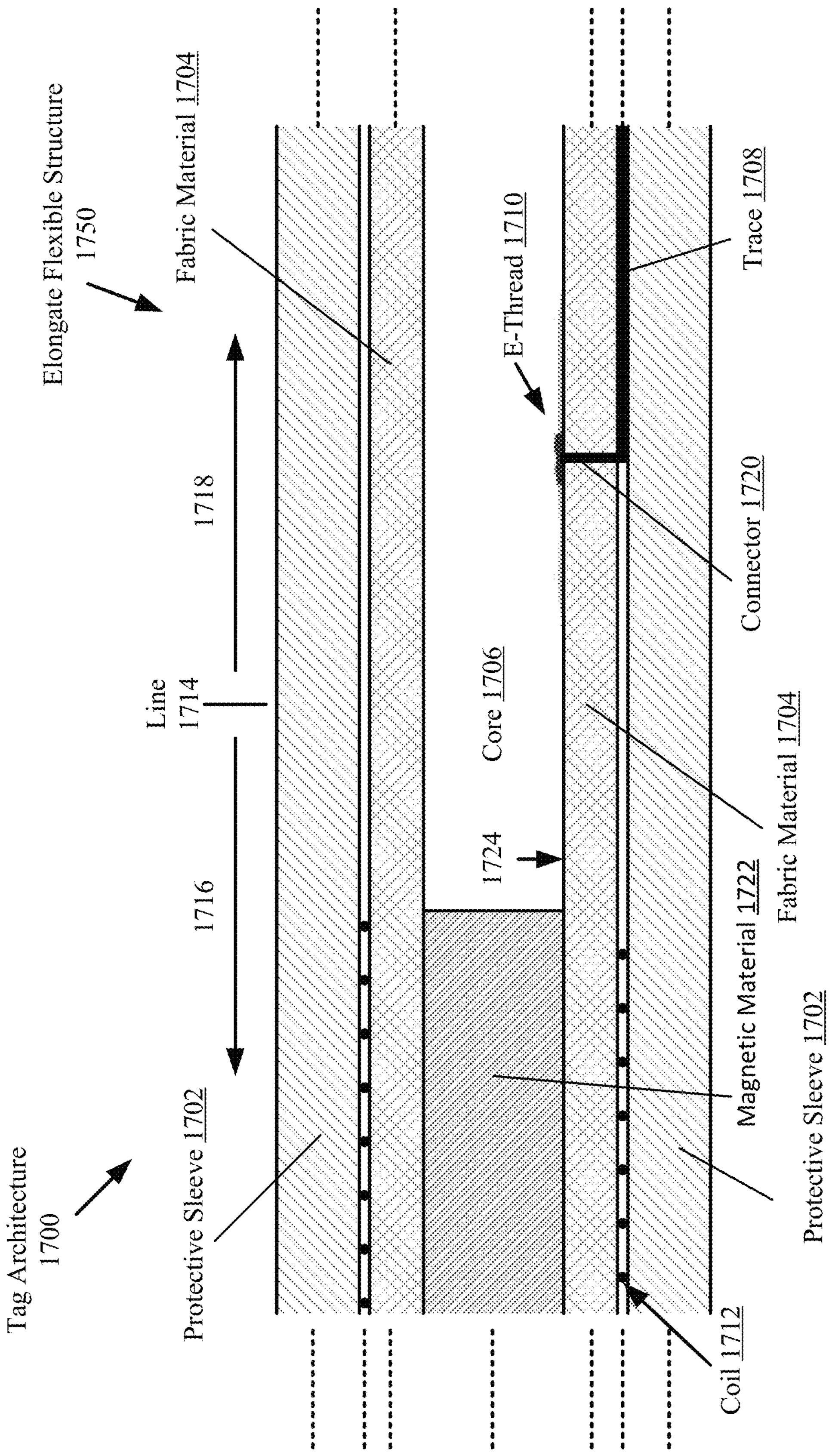

Referring now to FIG. 17, there is provided a cross-sectional view of an illustrative tag architecture 1700. The architecture 1700 comprises an elongate flexible structure 1750. The elongate flexible structure 1750 includes, but is not limited to, a lanyard, a rope, a string or a zip tie. The elongate flexible structure 1750 has a plurality of layers. The layers include a core 1706, a fabric material 1704, and a protective sleeve 1702. The present solution is not limited to the number of layers shown in FIG. 17. The elongate flexible structure 1750 can include additional layers selected in accordance with a particular application. These additional layers can reside between layers 1702, 1704 or above layer 1702.

The fabric material 1704 is protected from damage by the protective sleeve 1702. The protective sleeve 1702 is formed of a high strength material, such as ePTFE, Kevlar or a rubber.

The core 1706 comprises a space inside the fabric material 1704. The core 1706 is partially filled with a fluid (e.g., air) or solid (e.g., ePTFE), and/or partially or completely filled with a magnetic or metallic material 1722 (e.g., ferromagnetic or iron) in some proportion therein. The material 1722 includes, but is not limited to, an iron-based or magnetic rod or a plurality of iron-based or magnetic beads. A coil 1712 is wrapped around the fabric material 1704 and material 1722 so as to form an EAS element 1512. The present solution is not limited to this arrangement of the coil. The coil may alternatively be wrapped around the material 1722 and not the fabric material 1704. Also, core 1706 can be absent of the material 1722 such that the coil is wrapped around a fluid (e.g., air or ferrofluid) or solid (e.g., ePTFE) filled core.

An e-thread 1710 is also integrated with the elongate flexible structure 1750. The e-thread 1710 is coupled to an inner surface 1724 of the fabric material 1704 via an adhesive (e.g., glue). The e-thread 1710 comprises one or more antenna elements coupled to an IC. The IC is configured to operate as a communications device. The communications device includes, but is not limited to, an RFID enabled device, an SRC enabled device, or an NFC enabled device.

The communications device can be passive or active. In the passive scenarios, the IC derives power from received RF, SRC or NFC energy. As such, an external power source is not needed in this scenario. In contrast, in the active scenarios, an external power source (e.g., a battery) is provided to power the IC. The external power source (not shown) is located in the tag body (e.g., tag body 702 of FIG. 7). A connector 1720 and a trace 1708 are provided to electrically connect the e-thread 1710 to an electrical connector (e.g., pin 1002 of FIG. 10) located at a free end (e.g., end 708 of FIG. 7) of the elongate flexible structure 1750. The electrical connector is formed of an electrically conductive materials so that it facilitates an electrical connection between the e-thread 1710 and the external power source located in the tag's body. The battery element for the active scenario could also be located along the fabric material 1704 and similarly connected to any number of communication device contained within the structure.

Figure 18:
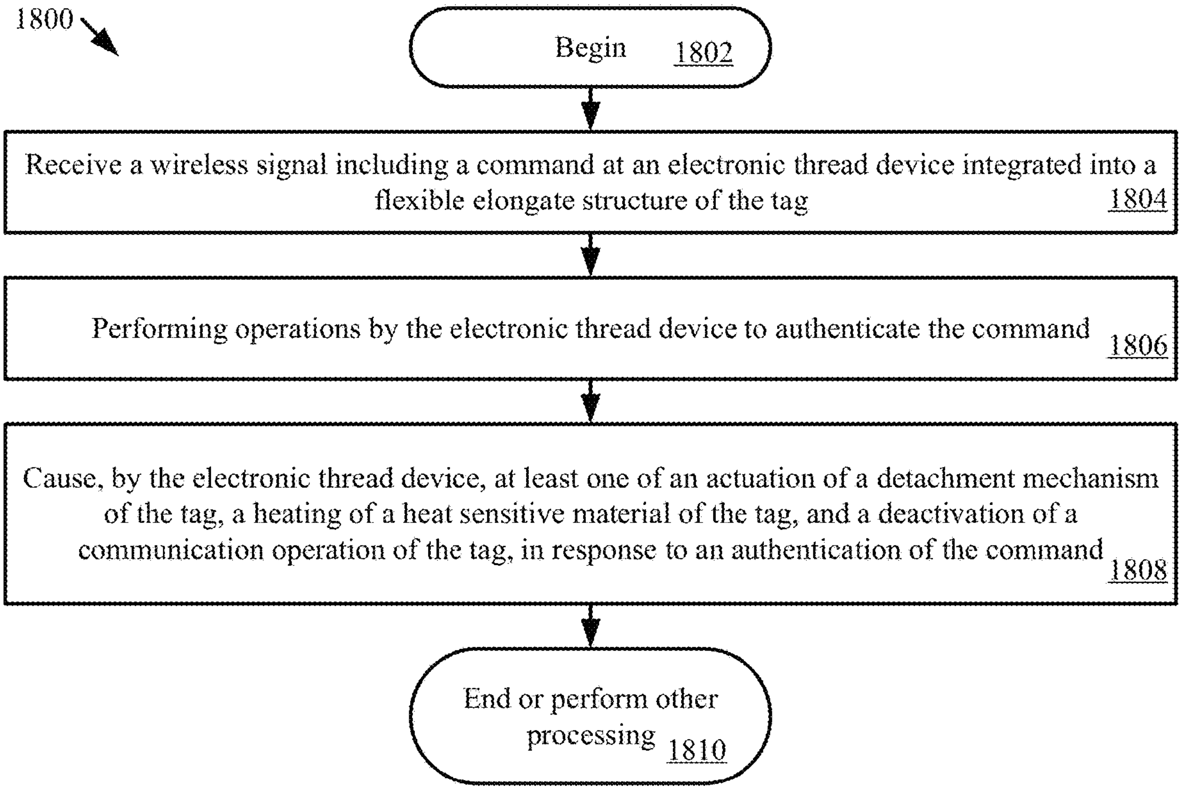
FIG. 18 is a flowchart of an example method for operating a tag, in accordance with an implementation of the present disclosure.

Referring now to FIG. 18, there is provided a flow diagram of an illustrative method 1800 for operating a tag (e.g., tag 132 of FIGS. 1-2, 700 of FIGS. 7-11, 1200 of FIG. 12, 1300 of FIG. 13, 1400 of FIG. 14, 1500 of FIG. 15, 1600 of FIG. 16, or 1700 of FIG. 17). The method 1800 begins with 1802 and continues with 1804 where a wireless signal including a command is received at an electronic thread device (e.g., e-thread 1410 of FIG. 14, 1510 of FIG. 15, 1610 of FIG. 16, or 1710 of FIG. 17) integrated into a flexible elongate structure (e.g., elongate flexible structure 1450 of FIG. 14, 1550 of FIG. 15, 1650 of FIG. 16, or 1750 of FIG. 17) of the tag.

In next 1806, the electronic thread device performs operations to authenticate the command. The authentication is achieved by comparing an identifier contained in the wireless signal to an identifier (e.g., unique identifier 210 of FIG. 2) stored in a memory (e.g., memory 208 of FIG. 2) of the electronic thread device. In response to the commands authentication, the electronic thread device causes at least one of an actuation of a detachment mechanism (e.g., detachment mechanism 250 of FIG. 2) of the tag, a heating of a heat sensitive material (e.g., heat sensitive material or electrical trace 1206 of FIG. 12) of the tag, and a deactivation of a communication operation of the tag, as shown by 1808. The deactivation of the communication operation can be performed in response to (a) a kill or temporary disable command's reception at the tag or (b) other software controlled means. Subsequently, method 1800 ends or other processing is performed.

The electronic thread device comprises an antenna (e.g., antenna 202 of FIG. 2, and/or 1414 of FIG. 14) and an IC (e.g., communications enabled device 136 of FIG. 2 and/or IC 1416 of FIG. 14). The flexible elongate structure comprises a cord (e.g., lanyard 704 of FIGS. 7-11 or elongate coupler 1204 of FIG. 12) or a cable (e.g., lanyard 704 of FIGS. 7-11 or zip tie 1302-1306 of FIG. 13). The flexible elongate structure comprises a fabric layer (e.g., fabric layer 1404 of FIG. 14, 1504 of FIG. 15, 1604 of FIG. 16, and/or 1704 of FIG. 17) on which the electronic thread device is disposed, or to which the electronic thread device is placed adjacent or coupled. A battery (e.g., battery 220 of FIG. 2, 1408 of FIG. 14, 1508 of FIG. 15, 1608 of FIG. 16) may be printed on the fabric layer for supplying power to the electronic thread device. Alternatively, a trace (e.g., trace 1708 of FIG. 17) is formed on the fabric layer that connects the electronic thread device to an external power source located in the tag's body (e.g., tag's body 702 of FIG. 2). The flexible elongate structure further comprises a protective sleeve (e.g., protective sleeve 1402 of FIG. 14, 1502 of FIG. 15, 1602 of FIG. 16 and/or 1702 of FIG. 17) to prevent damage to the fabric layer and electronic thread device. The electronic thread device may be compressed between the protective sleeve and the fabric layer.

An EAS component (e.g., EAS component 1412 of FIG. 14, 1512 of FIG. 15, 1612 of FIG. 16, or 1712/1722 of FIG. 17) may also be integrated into a flexible elongate structure of the tag. The EAS component may comprise a rigid or flexible magnetic or non-magnetic metallic material (e.g., magnetic material 1722 of FIG. 17) disposed in a core layer (e.g., core 1706 of FIG. 17) of the tag's flexible elongate structure and a coil (e.g., coil 1712 of FIG. 17) wrapped around or bonded at the ends to at least one of the metallic material and a fabric layer of the tag's flexible elongate structure. Alternatively, the EAS component comprises a resonator and bias element.

In the dual technology scenarios, the elongate flexible structure could comprise a metallic rope and an IC coupled thereto. The metallic rope would act as both the mechanical and electrical antenna element(s) of a communication device implemented by the IC.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

What is claimed is:

1. A method for operating a tag, comprising:

receiving a wireless signal including a command at an electronic thread device integrated into a flexible elongate structure of the tag, the electronic thread device being an e-thread;

performing operations by the electronic thread device to authenticate the command; and causing, by the electronic thread device, at least one of an actuation of a detachment mechanism of the tag, and a deactivation of a communication operation of the tag, in response to an authentication of the command, wherein an Electronic Article Surveillance ("EAS") component or an Integrated Circuit ("IC") is also integrated into the flexible elongate structure of the tag, wherein the actuation or the deactivation is caused by a battery printed on a layer or an energy harvesting device for supplying power to the electronic thread device.

2. The method according to claim 1, wherein the flexible elongate structure comprises a cord or a cable.

3. The method according to claim 1, wherein the electronic thread device comprises an antenna.

4. The method according to claim 1, wherein the flexible elongate structure comprises a fabric layer on which the electronic thread device is disposed, or to which the electronic thread device is placed adjacent or coupled.

5. The method according to claim 4, wherein the battery is printed on the fabric layer.

6. The method according to claim 4, wherein the flexible elongate structure further comprises a protective sleeve to prevent damage to the fabric layer and electronic thread device.

7. The method according to claim 6, wherein the electronic thread device is compressed between the protective sleeve and the fabric layer.

8. The method according to claim 4, wherein a trace is formed on the fabric layer that connects the electronic thread device to the battery or the energy harvesting device located in a body of the tag.

9. The method according to claim 1, wherein the EAS component comprises a magnetic or metallic material disposed in a core layer of the flexible elongate structure of the tag and a coil wrapped around at least one of the magnetic or metallic material and a fabric layer of the flexible elongate structure of the tag.

10. A tag, comprising:

a flexible elongate structure; and an electronic thread device integrated into the flexible elongate structure, the electronic thread device being an e-thread, and configured to:

receive a wireless signal including a command from an external device, authenticate the command, and cause at least one of an actuation of a detachment mechanism of the tag, and a deactivation of a communication operation of the tag, in response to an authentication of the command;

wherein an Electronic Article Surveillance ("EAS") component or an Integrated Circuit ("IC") is also integrated into the flexible elongate structure of the tag, wherein the actuation or the deactivation is caused by a battery printed on a layer or an energy harvesting device for supplying power to the electronic thread device.

11. The tag according to claim 10, wherein the flexible elongate structure comprises a cord or a cable.

12. The tag according to claim 10, wherein the electronic thread device comprises an antenna.

13. The tag according to claim 10, wherein the flexible elongate structure comprises a fabric layer on which the electronic thread device is disposed, or to which the electronic thread device is placed adjacent or coupled.

14. The tag according to claim 13, wherein the battery is printed on the fabric layer.

15. The tag according to claim 13, wherein the flexible elongate structure further comprises a protective sleeve to prevent damage to the fabric layer and electronic thread device.

16. The tag according to claim 15, wherein the electronic thread device is compressed between the protective sleeve and the fabric layer.

17. The tag according to claim 13, wherein a trace is formed on the fabric layer that connects the electronic thread device to the battery or the energy harvesting device located in a body of the tag.

18. The tag according to claim 10, wherein the EAS component comprises a magnetic or metallic material disposed in a core layer of the flexible elongate structure of the tag and a coil wrapped around at least one of the magnetic or metallic material and a fabric layer of the flexible elongate structure of the tag.

19. A tag, comprising:

a flexible elongate structure comprising a cord or a cable;

a detachment mechanism configured to perform at least one of an actuation of the detachment mechanism, and a deactivation of a communication operation of the tag, in response to an authentication of a command;

an electronic thread device integrated into the cord or cable that is operative to wirelessly communicate with external devices for inventory management or security purposes, the electronic thread device being an e-thread; and an Electronic Article Surveillance ("EAS") component or an Integrated Circuit ("IC") integrated into the cord or cable wherein the actuation or the deactivation is caused by a battery printed on a layer or an energy harvesting device for supplying power to the electronic thread device.

* * * * *